(12) United States Patent
Ono et al.

(10) Patent No.: US 7,401,232 B2
(45) Date of Patent: Jul. 15, 2008

(54) CONTENT PLAYBACK APPARATUS METHOD AND PROGRAM AND KEY MANAGEMENT APPARATUS AND SYSTEM

(75) Inventors: Takatoshi Ono, Ama-gun (JP); Yoji Kumazaki, Kasugai (JP); Shigeru Yamada, Mino (JP); Hiroki Murakami, Suita (JP); Tetsuya Inoue, Ibaraki (JP); Motoji Ohmori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 803 days.

(21) Appl. No.: 10/482,846

(22) PCT Filed: Mar. 18, 2003

(86) PCT No.: PCT/JP03/03232

§ 371 (c)(1),
(2), (4) Date: Jan. 6, 2004

(87) PCT Pub. No.: WO03/079689

PCT Pub. Date: Sep. 25, 2003

(65) Prior Publication Data

US 2005/0021985 A1    Jan. 27, 2005

(30) Foreign Application Priority Data

Mar. 20, 2002 (JP) ............................... 2002-078397
Dec. 16, 2002 (JP) ............................... 2002-364389
Feb. 28, 2003 (JP) ............................... 2003-054134

(51) Int. Cl.
*G06F 12/14* (2006.01)

(52) U.S. Cl. ............................ 713/193; 725/25; 725/26; 725/27; 725/28; 725/29; 725/30; 725/31; 713/193

(58) Field of Classification Search .................. 725/31
See application file for complete search history.

(56) References Cited

U.S. PATENT DOCUMENTS

| 4,613,901 A | 9/1986 | Gilhousen et al. |
| 5,144,664 A | 9/1992 | Esserman et al. |

(Continued)

FOREIGN PATENT DOCUMENTS

EP    0 866 613 A1    9/1998

(Continued)

OTHER PUBLICATIONS

Namba, Seiichi, "Information Security in Broadcasting," NHK Science and Technical Research Laboratories, ISEC 89-35, pp. 19-28.

(Continued)

*Primary Examiner*—Kambiz Zand
*Assistant Examiner*—Yonas Bayou

(57) ABSTRACT

A key management apparatus which can be used to encrypt/decrypt content data in a content playback device includes a storing unit for storing a secret key, a key information decrypting unit for decrypting encrypted key information and an updating unit operable to update the secret key with an algorithm stored therein, when the decrypted key information is key-updating information. Seed information can be received for use with the algorithm to provide a new secret key, and preliminary trigger information can be used to poll a group of appliances to request key information to determine any duplication of appliances.

18 Claims, 26 Drawing Sheets

U.S. PATENT DOCUMENTS

| | | | |
|---|---|---|---|
| 6,118,873 | A | 9/2000 | Lotspiech et al. |
| 6,157,719 | A * | 12/2000 | Wasilewski et al. ......... 380/210 |
| 6,609,116 | B1 | 8/2003 | Lotspiech et al. |
| 6,650,753 | B1 | 11/2003 | Lotspiech et al. |
| 6,832,319 | B1 | 12/2004 | Bell et al. |
| 6,883,097 | B1 | 4/2005 | Lotspiech et al. |
| 6,888,944 | B2 | 5/2005 | Lotspiech et al. |
| 6,947,563 | B2 | 9/2005 | Fagin et al. |
| 7,007,162 | B1 | 2/2006 | Lotspiech |
| 7,072,865 | B2 | 7/2006 | Akiyama |
| 2002/0106087 | A1 | 8/2002 | Lotspiech et al. |
| 2002/0114471 | A1 | 8/2002 | Fagin et al. |
| 2004/0076404 | A1 * | 4/2004 | Nakano et al. ................ 386/94 |
| 2004/0156503 | A1 | 8/2004 | Bell et al. |
| 2005/0018854 | A1 * | 1/2005 | Yamamoto et al. .......... 380/277 |
| 2005/0271211 | A1 * | 12/2005 | Takemura .................. 380/277 |

FOREIGN PATENT DOCUMENTS

| | | |
|---|---|---|
| EP | 1 094 667 A1 | 4/2001 |
| JP | 10-171717 | 6/1988 |
| JP | 1-248891 | 10/1989 |
| JP | 2096489 | 4/1990 |
| JP | 4286434 | 10/1992 |
| JP | 2000-031922 | 1/2000 |
| JP | 2000-231760 | 8/2000 |
| JP | 2002-16901 | 1/2002 |

OTHER PUBLICATIONS

Ihori, Shoko et al., "Access Control Methods for Multicast Streaming Contents Distribution," NTT Information Sharing Platform Laboratories, Jun. 8, 2001, pp. 83-88.

Menzes, Alfred J. et al., "Handbook of Applied Cryptography," 1989, pp. 497-498.

EBU Project Group B/CA; Functional Model of a Conditional Access System; EBU Technical Review, Winter 1995 No. 266; Grand-Saconnex, CH; pp. 64-77.

* cited by examiner

FIG.12

| EMM | ID | | IDENTIFIER | SEED INFORMATION | |

FIG.16

| ID | MASTER KEY Km | | | | |
|---|---|---|---|---|---|
| | FIRST GENERATION | SECOND GENERATION | THIRD GENERATION | FOURTH GENERATION | ... |
| 00000001 | 27832529 | 34953290 | | | |
| 00000002 | 61473117 | 33920852 | 23959193 | | |
| 00000003 | 32921106 | | | | |
| 00000004 | 84054212 | 59316591 | 73959139 | 33997593 | |
| 00000005 | 65143794 | 23415143 | | | |
| ... | ... | ... | ... | ... | |

CONTENT PLAYBACK APPARATUS METHOD AND PROGRAM AND KEY MANAGEMENT APPARATUS AND SYSTEM

TECHNICAL FIELD

This invention relates to a broadcast reception system in which only such playback apparatuses that are owned by users authorized to view digital broadcast contents are able to play back contents properly (hereafter, referred to as the "conditional access system"), and particularly to a technique for updating master keys that are needed at times of playing back the contents.

BACKGROUND ART

In MPEG-2 Systems (ISO/IEC13818-1), which is a standard conditional access system, the distributor transmits contents including images and audio after scrambling them with a scrambling key Ks. The receiver plays back the contents after descrambling them with a scrambling key Ks. At this time, the distributor and the receiver each need to have the same scrambling key Ks.

The distributor therefore stores the scrambling key Ks into a piece of information called ECM (Entitlement Control Messages), and transmits the ECM after encrypting them with a work key Kw. Further, the distributor stores the work key Kw into a piece of information called EMM (Entitlement Management Messages), and transmits the EMM after encrypting them with a master key Km which is unique to each playback apparatus.

The receiver decrypts the EMM using the master key Km that is of its own to obtain the work key Kw, and then decrypts the ECM using the work key Kw to obtain the scrambling key Ks. This way, the distributor and the receiver each have the same scrambling key Ks.

FIG. 1 shows the general structure of the conditional access system.

The broadcast apparatus 101 multiplexes and transmits to the playback apparatus 102 by broadcast, various kinds of information including scrambled contents, ECM, EMM. The playback apparatus 102 descrambles/decrypts the information and displays it on a display monitor 103. At this time, the playback apparatus 102 performs decryption with use of an ID and a master key Km stored in the playback apparatus itself, and then descrambles the scrambled contents. A different ID is assigned to each playback apparatus, each manufacturer, or else, as necessary. Also, a different master key Km is assigned to each playback apparatus, each manufacturer, or else, as necessary. The master keys correspond one-to-one with the IDs.

FIG. 2 shows the structure of the playback apparatus in the conditional access system.

In the playback apparatus 201, the receiving unit 202 receives various kinds of information including scrambled contents, ECM, EMM, and the type judging unit 203 judges the types of information. The type judging unit 203 transfers information to different units depending on what type of information it is; for example, it transfers scrambled contents to the content descrambling unit 211, ECM to the ECM decrypting unit 208, and EMM to the EMM decrypting unit 205.

The ID/Km storing unit 204 stores an ID and a master key that are unique to the playback apparatus 201. The EMM decrypting unit 205 decrypts EMM with the master key Km, and inputs, to the Kw updating unit 206, a work key Kw which has been a part of the decrypted EMM. The Kw updating unit 206 obtains the work key Kw from the EMM decrypting unit 205 and updates the existing work key Kw. The Kw storing unit 207 stores the work key Kw that has been updated by the Kw updating unit 206.

There is also another example where, in order to update an existing work key, a new work key is obtained through a bi-directional communication system. (e.g. see Japanese Unexamined Patent Application Publication No. 2002-16901)

The ECM decrypting unit 208 decrypts ECM with the work key Kw, and inputs, to the Ks updating unit 209, a scrambling key Ks which has been a part of the decrypted ECM. The Ks updating unit 209 obtains the scrambling key Ks from the ECM decrypting unit 208 and updates the existing scrambling key Ks.

Here, updating of the work key Kw and the scrambling key Ks usually means to overwrite them; however, it is acceptable to make additions to the work key and the scrambling key.

The Ks storing unit 210 stores the scrambling key Ks that has been updated by the Ks updating unit 209. The content descrambling unit 211 descrambles the scrambled contents using the scrambling key Ks, and inputs the descrambled contents to the content outputting unit 212. The content outputting unit 212 transmits the contents to the display monitor.

FIG. 3 shows the operation of the playback apparatus in the conditional access system.

The playback apparatus receives EMM from the broadcast apparatus (S301). The EMM include (i) an ID of a playback apparatus that is to receive the EMM and (ii) an encrypted work key E(Kw, Km) which is a work key Kw encrypted with a master key Km that corresponds to the ID. Here and hereafter, E(X, Y) denotes "information X encrypted with the key Y" or "information X scrambled with the key Y".

The playback apparatus decrypts E(Kw, Km) using a Km stored in the playback apparatus itself, if the ID included in EMM coincides with the ID stored in the playback apparatus itself. As a result, the playback apparatus obtains the work key Kw (S302).

Next, the playback apparatus receives ECM from the broadcast apparatus (S303). The ECM include an encrypted scrambling key E (Ks, Kw) which is a scrambling key Ks encrypted with a work key Kw.

The playback apparatus decrypts E (Ks, Kw) using the work key Kw stored in the playback apparatus itself. As a result, the playback apparatus obtains the scrambling key Ks (S304).

Further, the playback apparatus receives a scrambled content E(Content, Ks) from the broadcast apparatus (S305).

The playback apparatus descrambles E(Content, Ks) using the scrambling key Ks stored in the playback apparatus itself. As a result, the playback apparatus obtains the content (S306) and the user is able to view the content.

FIG. 4 shows the general structure of the conditional access system in which there are a plurality of playback apparatuses.

The playback apparatus 1 and the playback apparatus 2 receive various kinds of information transmitted from the broadcast apparatus 101. A display monitor is omitted from the drawing. The ID1 and the ID2 are assigned to each of the playback apparatuses respectively and are different from each other. Since IDs correspond one-to-one with master keys Kms, Km1 and Km2 are different from each other as well. Here, a different ID is assigned to each playback apparatus, but it is also acceptable if a different ID is assigned to each manufacturer, each model of playback apparatuses, each production lot, or each specific group. In such cases, a plurality of playback apparatuses within a group have the same IDs and master keys Kms, but those IDs and master keys are different from IDs and master keys owned by playback apparatuses in another group.

FIG. 5 shows the operation of the plurality of playback apparatus in the conditional access system.

The playback apparatus 1 selectively receives EMM 1 from the broadcast apparatus (S501). EMM 1 includes the ID1 and an encrypted work key E(Kw, Km1) which is a work key Kw encrypted with the master key Km1 that corresponds to the ID1. Because of the ID1 included in EMM 1, the playback apparatus 1 is able to identify that this particular set of EMM is addressed to the playback apparatus 1 itself.

The playback apparatus 1 decrypts E(Kw, Km1) using the Km1 stored in the playback apparatus 1 itself. As a result, the playback apparatus 1 obtains the work key Kw (S502).

The playback apparatus 2 selectively receives EMM 2 from the broadcast apparatus (S503). EMM 2 include ID2 and an encrypted work key E(Kw, Km2) which is the work key Kw encrypted with the master key Km2 that corresponds to ID2. Because of the ID2 included in EMM 2, the playback apparatus 2 is able to identify that this particular set of EMM is addressed to the playback apparatus 2 itself.

The playback apparatus 2 decrypts E(Kw, Km2) using the Km2 stored in the playback apparatus 2 itself. As a result, the playback apparatus 2 obtains the work key Kw (S504).

This is how the playback apparatus 1 and the playback apparatus 2 each obtain the work key Kw. The procedure after this is the same as the one described in FIG. 3; therefore, explanation will be omitted.

The following describe a method of preventing an unauthorized apparatus from playing back contents, when there is one.

FIG. 6 shows the general structure of the conditional access system in which there is an unauthorized apparatus.

The unauthorized playback apparatus is a playback apparatus that disguises itself as the playback apparatus 2 with ID2 and the master Key Km2 having been obtained in an unauthorized fashion. In this situation, the unauthorized apparatus is able to pretend as if it was the playback apparatus 2 and play back the contents, by the same procedure of operations shown in FIG. 5.

Here is a method by which the broadcast apparatus does hot transmit EMM that include the ID2 so that it is possible to prevent unauthorized playback of contents when it has been learned that an unauthorized apparatus exists.

FIG. 7 shows the operation of the playback apparatuses at times of preventing an unauthorized apparatus from performing unauthorized playback of contents.

FIG. 7 differs from FIG. 5 in that the broadcast apparatus transmits only EMM 1 intended for the playback apparatus 1 (S501), and does not transmit EMM2 which are intended for the playback apparatus 2. This way, the unauthorized apparatus is not able to obtain the work key Kw. As a result, the unauthorized playback apparatus is not able to obtain a scrambling key Ks (S701), and is not able to receive the contents, either (S702).

There is, however, a problem in this method since the broadcast apparatus does not transmit EMM that include the ID2. —The playback apparatus 2, being an authorized apparatus, will not be able to play back the contents, either.

The first object of the present invention, therefore, is to provide a technique that makes it possible to eliminate content playback by unauthorized playback apparatus, and enable only authorized playback apparatuses to play back contents properly.

The second object of the present invention is to provide a technique that enables only authorized playback apparatus to play back contents properly by utilizing the channel through which the contents are transmitted.

DISCLOSURE OF THE INVENTION

The present invention provides a content playback apparatus comprising: a storing unit that has a secret key stored therein; a key information decrypting unit operable to (i) obtain encrypted key information that has been encrypted by a first secret-key encrypting method, and (ii) decrypt the encrypted key information into key information using the stored secret key, the key information being either a decryption key used for decrypting a content key or key-updating information used for updating the secret key; a content playback unit operable to, when the decrypted key information is the decryption key, (i) decrypt an encrypted content key that has been encrypted by a second secret-key encrypting method, using the decryption key, (ii) descramble a scrambled content that has been scrambled by a scramble encrypting method, using the decrypted content key, and (iii) play back the descrambled content; and an updating unit operable to, when the decrypted key information is the key-updating information, update the secret key according to the key-updating information.

With this arrangement, the content playback apparatus obtains key information and (a) when the key information is key-updating information, updates the secret key, and (b) when the key information is a decryption key, plays back contents using the decryption key. By updating the secret key according to the key-updating information in this fashion, when obtaining key information that has been encrypted with use of the updated secret key, the content playback apparatus will be able to properly decrypt this encrypted key information.

Accordingly, after the secret key is updated, only authorized content playback apparatuses are able to play back contents, and it is therefore possible to eliminate content playback by unauthorized content playback apparatus.

The content playback apparatus may have an arrangement wherein, the key information has an identifier attached thereto for identifying the key information as either the decryption key or the key-updating information, and the content playback apparatus further comprises a judging unit operable to judge, according to the identifier, whether the key information is the decryption key or the key-updating information.

With this arrangement, the content playback apparatus is able to judge from the identifier whether the key information is a decryption key or key-updating information.

The content playback apparatus may have an arrangement wherein the key information is included in EMM, EMM denoting Entitlement Management Messages, and the content playback apparatus further comprises a broadcast receiving unit operable to receive broadcast data which includes encrypted EMM that have been encrypted with use of the secret key and thereby obtain the encrypted key information, and the key information decrypting unit obtains the encrypted key information received by the broadcast receiving unit.

One of the ways to update a secret key is that a manager of the secret keys sends, to each authorized user, a portable medium on which a new secret key is recorded. In this method, it takes a considerable number of days before each authorized user receives the portable medium, and there is a possibility that the authorized users suffer a loss of privilege to view the contents meanwhile. Also, from the viewpoint of the manager of the secret keys, it is necessary to send a portable medium to each of the users when secret keys of a plurality of content playback apparatuses need to be updated, and the costs that the manager needs to bear would be very high.

With the aforementioned arrangement, however, the content playback apparatus is able to obtain the key-updating information by receiving the broadcast data. Since the key-updating information is transmitted by broadcast, it is possible to update the secret key instantly.

This way, the authorized users will not suffer a loss as mentioned above. Besides, it is possible to notify a plurality of content playback apparatuses of updating of the secret keys at the same time by transmitting the key-updating information by broadcast.

Thus, the manager of the secret keys is able to reduce the costs mentioned above.

The content playback apparatus may have an arrangement wherein the updating unit updates the secret key by generating a new secret key according to a conversion unique to each content playback apparatus, each production lot of content playback apparatuses, each model of content playback apparatuses, or each manufacturer of content playback apparatuses.

With this arrangement, since the secret key is updated according to a conversion that is unique to each content playback apparatus, each production lot of content playback apparatuses, each model of content playback apparatuses, or each manufacturer of content playback apparatuses, there will only be a limited number of content playback apparatuses for which measures need to be taken, even if a content playback apparatus is reverse-engineered and the conversion method of the secret key has leaked out.

The content playback apparatus may have an arrangement wherein the key-updating information includes seed information from which a new secret key is to be generated, and the updating unit updates the secret key by converting the seed information into the new secret key.

With this arrangement, since the key-updating information includes seed information, the content playback apparatus is able to obtain the seed information and generate a new secret key by converting the seed information.

The content playback apparatus may have an arrangement wherein the key-updating information is trigger information which instructs that the secret key should be updated, and the updating unit further includes: a transmitting subunit operable to transmit, in response to the trigger information, a request signal requesting seed information from which a new secret key is to be generated, to a key management apparatus that manages one or more secret keys; and a seed information receiving subunit operable to receive the seed information transmitted by the key management apparatus in response to the request signal, and the updating unit updates the secret key by converting the received seed information into the new secret key.

With this arrangement, the content playback apparatus obtains trigger information and realizes that the secret key needs to be updated due to the trigger information. Then, the content playback apparatus transmits a request for seed information to the key management apparatus, receives the seed information, and obtains a new secret key by converting the seed information. Communicating with the key management apparatus after receiving the key-updating information has two advantages as follows:

One is that the key management apparatus is able to determine from which content playback apparatus the unauthorized content playback apparatus has derived. For example, if it has been arranged so that content playback apparatuses need to transmit their own IDs as a requesting signal and there is an unauthorized content playback apparatus, then the same ID will be transmitted to the key management apparatus more than once. Then, the key management apparatus is able to judge that the content playback apparatus having this particular ID is the one from which the unauthorized content playback apparatus has derived.

The other advantage is that the key management apparatus is able to find out that the content playback apparatus is updating a master key. For example, in a case where only seed information is transmitted by broadcast, the key management apparatus is not able to find out that the content playback apparatus is updating a master key. With the aforementioned arrangement, however, the key management apparatus is able to confirm at least that the content playback apparatus has received the key-updating information because there is communication from the content playback apparatus.

The content playback apparatus may have an arrangement wherein the key-updating information includes seed information from which a new secret key is to be generated, and the updating unit further includes an outputting subunit operable to output event information that is different every time of output or once in every certain number of times of output, the updating unit updates the secret key by converting the seed information and the event information into the new secret key, and the content playback apparatus further comprises a transmitting unit operable to transmit the event information outputted by the outputting subunit to a key management apparatus that manages one or more secret keys.

With this arrangement, the content playback apparatus generates a new secret key from the seed information and the event information, and also transmits the event information in order to let the key management apparatus have the same new secret key. Communicating with the key management apparatus after receiving the key-updating information has two advantages as follows:

One is that the key management apparatus is able to determine from which content playback apparatus the unauthorized content playback apparatus has derived. For example, if it has been arranged so that content playback apparatuses need to transmit their own IDs as a requesting signal and there is an unauthorized content playback apparatus, then the same ID will be transmitted to the key management apparatus more than once. Then, the key management apparatus is able to judge that the content playback apparatus having this particular ID is the one from which the unauthorized content playback apparatus has derived.

The other advantage is that the key management apparatus is able to find out that the content playback apparatus is updating a master key. For example, in a case where only seed information is transmitted by broadcast, the key management apparatus is not able to find out that the content playback apparatus is updating a master key. With the aforementioned arrangement, however, the key management apparatus is able to confirm at least that the content playback apparatus has received the key-updating information because there is communication from the content playback apparatus.

The content playback apparatus may have an arrangement wherein the secret key stored in the storing unit is unique to each content playback apparatus, each production lot of content playback apparatuses, each model of content playback apparatuses, or each manufacturer of content playback apparatuses.

With this arrangement, since the secret key is unique to each content playback apparatus, each production lot of content playback apparatuses, each model of content playback apparatuses, or each manufacturer of content playback apparatuses, there will only be a limited number of content playback apparatuses for which measures need to be taken, even if a content playback apparatus is reverse-engineered and the conversion method of the secret key has leaked out.

The content playback apparatus may further have an ID that is unique to each content playback apparatus, each production lot of content playback apparatuses, each model of content playback apparatuses, or each manufacturer of content playback apparatuses, wherein the updating unit updates the secret key by converting the ID and seed information into a new secret key, the seed information being information from which the new secret key is to be generated.

With this arrangement, since the ID is unique to each content playback apparatus, each production lot of content playback apparatuses, each model of content playback apparatuses, or each manufacturer of content playback apparatuses, there will only be a limited number of content playback apparatuses for which measures need to be taken, even if a content playback apparatus is reverse-engineered and the conversion method of the secret key has leaked out.

The present invention further provides a content playback method to be used in a content playback apparatus which includes a storing unit that has a secret key stored therein, the content playback method comprising: a key information decrypting step of (i) obtaining encrypted key information that has been encrypted by a first secret-key encrypting method, and (ii) decrypting the encrypted key information into key information using the stored secret key, the key information being either a decryption key used for decrypting a content key or key-updating information used for updating the secret key; a content playback step of, when the decrypted key information is the decryption key, (i) decrypting an encrypted content key that has been encrypted by a second secret-key encrypting method, using the decryption key, (ii) descrambling a scrambled content that has been scrambled by a scramble encrypting method, using the decrypted content key, and (iii) playing back the descrambled content; and an updating step of, when the decrypted key information is the key-updating information, updating the secret key according to the key-updating information.

With this arrangement, the content playback apparatus obtains key information and (a) when the key information is key-updating information, updates the secret key, and (b) when the key information is a decryption key, plays back contents using the decryption key. By updating the secret key according to the key-updating information in this fashion, when obtaining key information that has been encrypted with use of the updated secret key, the content playback apparatus will be able to properly decrypt this encrypted key information.

Accordingly, after the secret key is updated, only authorized content playback apparatuses are able to play back contents, and it is therefore possible to eliminate content playback by unauthorized content playback apparatus.

The present invention further provides a program that instructs a computer to play back contents, the computer including a storing unit that has a secret key stored therein, the program comprising: a key information decrypting step of (i) obtaining encrypted key information that has been encrypted by a first secret-key encrypting method, and (ii) decrypting the encrypted key information into key information using the stored secret key, the key information being either a decryption key used for decrypting a content key or key-updating information used for updating the secret key; a content playback step of, when the decrypted key information is the decryption key, (i) decrypting an encrypted content key that has been encrypted by a second secret-key encrypting method, using the decryption key, (ii) descrambling a scrambled content that has been scrambled by a scramble encrypting method, using the decrypted content key, and (iii) playing back the descrambled content; and an updating step of, when the decrypted key information is the key-updating information, updating the secret key according to the key-updating information.

With this arrangement, the computer obtains key information and (a) when the key information is key-updating information, updates the secret key, and (b) when the key information is a decryption key, plays back contents using the decryption key. By updating the secret key according to the key-updating information in this fashion, when obtaining key information that has been encrypted with use of the updated secret key, the content playback apparatus will be able to properly decrypt this encrypted key information.

Accordingly, after the secret key is updated, only authorized content playback apparatuses are able to play back contents, and it is therefore possible to eliminate content playback by unauthorized content playback apparatus.

The present invention further provides a key management apparatus that manages a secret key used in a secret-key encrypting method, comprising: a key-updating information generating unit operable to generate key-updating information used for updating the secret key; a transmitting unit operable to encrypt key information using the secret key and transmit the encrypted key information to a playback apparatus, the key information being either a decryption key for playing back contents or the key-updating information; and a secret key updating unit operable to update the secret key according to the key-updating information.

With this arrangement, since the key management apparatus transmits encrypted key information to the content playback apparatus, the key management apparatus and the content playback apparatus each will be able to have the same key information. Also, the key management apparatus is able to update the secret key according to key-updating information included in the key information. Consequently, after the secret key is updated, only authorized content playback apparatuses are able to playback contents, and it is therefore possible to eliminate content playback by unauthorized content playback apparatus.

The key management apparatus may have an arrangement wherein the transmitting unit attaches, to the key information, an identifier for identifying the key information as either the decryption key or the key-updating information, before transmitting the key information.

With this arrangement, the key management apparatus is able to transmit, in one form, two kinds of information such as a decryption key and key-updating information.

The key management apparatus may have an arrangement wherein the key information is included in EMM, EMM denoting Entitlement Management Messages, and the transmitting unit transmits the key information to the playback apparatus by broadcast.

With this arrangement, the key management apparatus is able to transmit the key-updating information by broadcast. Since the key-updating information is transmitted by broadcast, it is possible to update the secret keys instantly.

The key management apparatus may have an arrangement wherein the key-updating information includes seed information from which a new secret key is to be generated, and the secret key updating unit updates the secret key by converting the seed information into the new secret key.

With this arrangement, since the key-updating information includes seed information, the key management apparatus is able to generate the seed information and also to generate a new secret key by converting the seed information.

The key management apparatus may have an arrangement wherein the key-updating information is trigger information which instructs that the secret key should be updated, and the secret key updating unit further includes: a seed information generating subunit operable to generate seed information from which a new secret key is to be generated; and a transferring subunit operable to receive a request signal transmitted by the playback apparatus that has obtained the trigger information, and transfer the generated seed information to the playback apparatus in response to the request signal, and the secret key updating unit updates the secret key by converting the seed information into the new secret key.

With this arrangement, the key management apparatus generates trigger information and notifies the content playback apparatus, with use of the trigger information, that the secret key needs to be updated. Then, the key management apparatus receives from the content playback apparatus a request signal requesting seed information, transmits the seed information to the content playback apparatus in response to the request signal, and obtains a new secret key by converting the seed information. Communicating with the content playback apparatus after transmitting the key-updating information has two advantages as follows:

One is that the key management apparatus is able to determine from which content playback apparatus the unauthorized content playback apparatus has derived. For example, if it has been arranged so that content playback apparatuses need to transmit their own IDs as a requesting signal and there is an unauthorized content playback apparatus, then the same ID will be transmitted to the key management apparatus more than once. Then, the key management apparatus is able to judge that the content playback apparatus having this particular ID is the one from which the unauthorized content playback apparatus has derived.

The other advantage is that the key management apparatus is able to find out that the content playback apparatus is updating a master key. For example, in a case where only seed information is transmitted by broadcast, the key management apparatus is not able to find out that the content playback apparatus is updating a master key. With the aforementioned arrangement, however, the key management apparatus is able to confirm at least that the content playback apparatus has received the key-updating information because there is communication from the content playback apparatus.

The key management apparatus may have an arrangement wherein the key-updating information includes seed information from which a new secret key is to be generated, and the secret key updating unit further includes a receiving subunit operable to receive event information transmitted by the playback apparatus that has obtained the seed information, the event information being different every time of transmission or once in every certain number of times of transmission, and the secret key updating unit updates the secret key by converting the seed information and the event information into the new secret key.

With this arrangement, the key management apparatus receives the event information from the content playback apparatus and generates a new secret key from the seed information and the event information. Communicating with the content playback apparatus after transmitting the key-updating information has two advantages as follows:

One is that the key management apparatus is able to determine from which content playback apparatus the unauthorized content playback apparatus has derived. For example, if it has been arranged so that content playback apparatuses need to transmit their own IDs as a requesting signal and there is an unauthorized content playback apparatus, then the same ID will be transmitted to the key management apparatus more than once. Then, the key management apparatus is able to judge that the content playback apparatus having this particular ID is the one from which the unauthorized content playback apparatus has derived.

The other advantage is that the key management apparatus is able to find out that the content playback apparatus is updating a master key. For example, in a case where only seed information is transmitted by broadcast, the key management apparatus is not able to find out that the content playback apparatus is updating a master key. With the aforementioned arrangement, however, the key management apparatus is able to confirm at least that the content playback apparatus has received the key-updating information because there is communication from the content playback apparatus.

The present invention further provides a key management system made up of (i) a content playback apparatus and (ii) a key management apparatus that manages one or more secret keys used in a secret-key encrypting method for the content playback apparatus, the key management system comprising: a key-updating information generating unit that is included in the key management apparatus and is operable to generate key-updating information used for updating each secret key; a transmitting unit operable to encrypt key information using a first secret key, and transmit the encrypted key information to the content playback apparatus, the key information being either a decryption key for playing back contents or the key-updating information; a key information decrypting unit that is included in the content playback apparatus and is operable to obtain the encrypted key information transmitted by the transmitting unit and decrypt the encrypted key information into key information using a second secret key, the second secret key being stored in the content playback apparatus; a first updating unit that is included in the key management apparatus and is operable to update the first secret key according to the key-updating information; and a second updating unit that is included in the content playback apparatus and is operable to, when the decrypted key information is key-updating information used for updating the second secret key, update the second secret key according to the key-updating information.

With this arrangement, the content playback apparatus and the key management apparatus each obtain key information and (a) when the key information is key-updating information, update the secret key, and (b) when the key information is a decryption key, play back contents using the decryption key. By updating the secret keys according to the key-updating information in this fashion, when obtaining key information that has been encrypted with use of the updated secret key, the content playback apparatus and the key management apparatus each will be able to properly decrypt this encrypted key information.

Accordingly, after the secret keys are updated, only authorized content playback apparatuses are able to play back contents, and it is therefore possible to eliminate content playback by unauthorized content playback apparatus.

BRIEF DESCRIPTION OF THE DRAWINGS

FIG. 12 shows the data structure of EMM for updating a master key Km;

FIG. 16 shows an example of management of IDs and master keys Kms by the key management apparatus;

BEST MODE FOR CARRYING OUT THE INVENTION

First Embodiment

General Structure of the Conditional Access System

Figure 1:
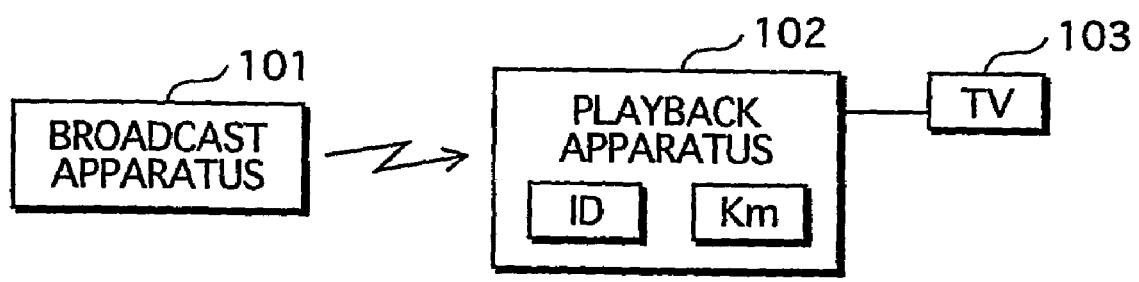
FIG. 1 shows the general structure of a conventional conditional access system.
Figure 2:
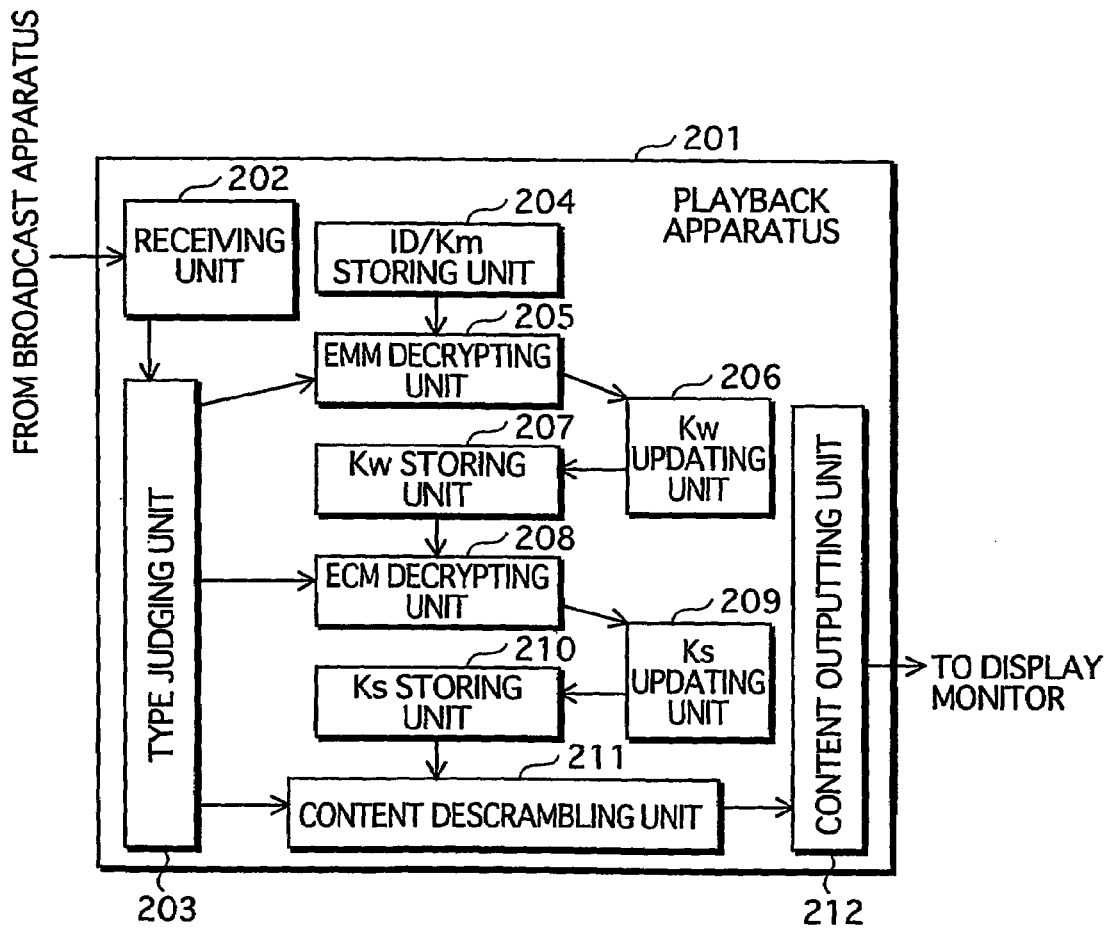
FIG. 2 shows the structure of a conventional playback apparatus in the conditional access system.
Figure 3:
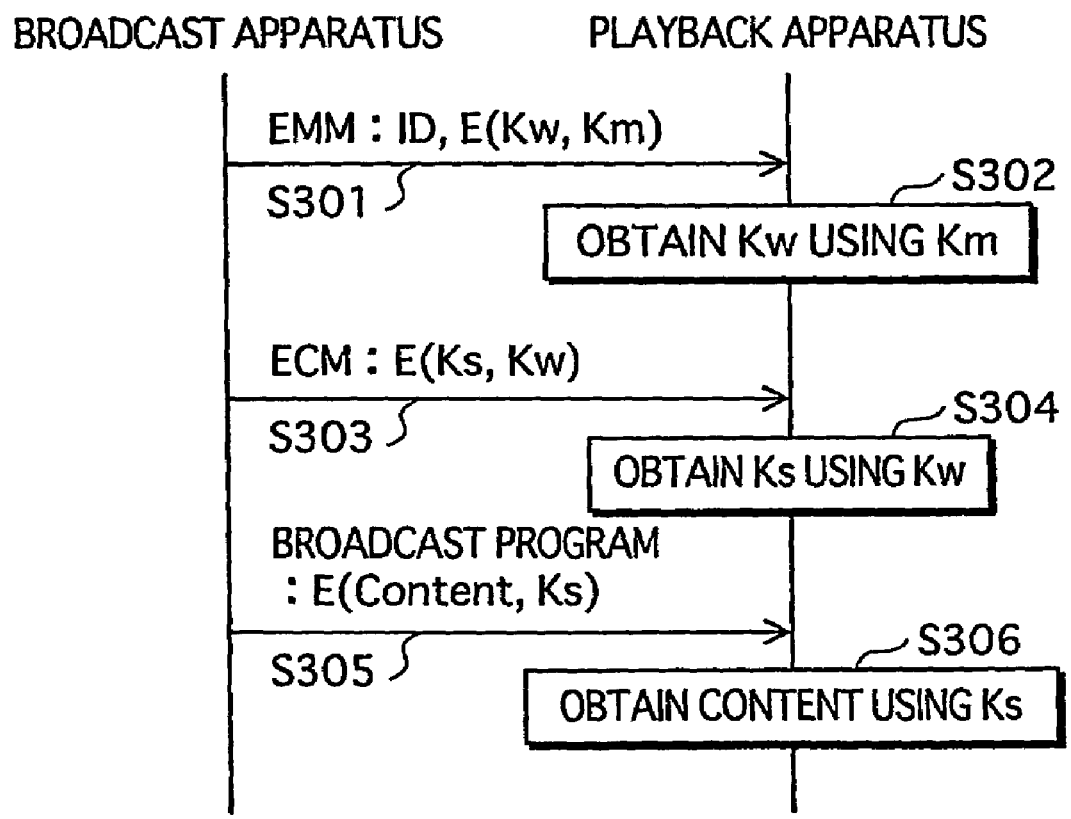
FIG. 3 shows the operation of the conventional playback apparatus in the conditional access system.
Figure 4:
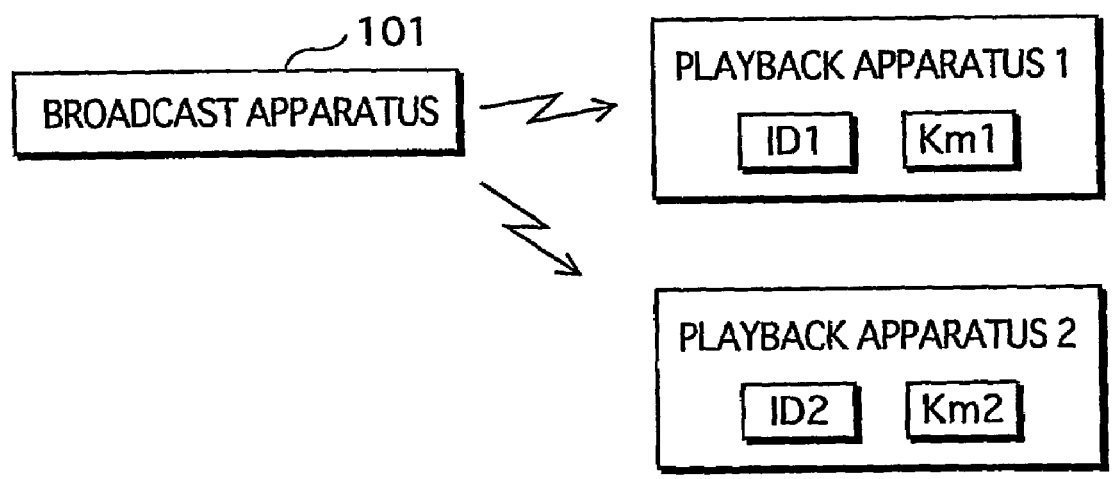
FIG. 4 shows the general structure of the conventional conditional access system in which there are a plurality of playback apparatuses.
Figure 5:
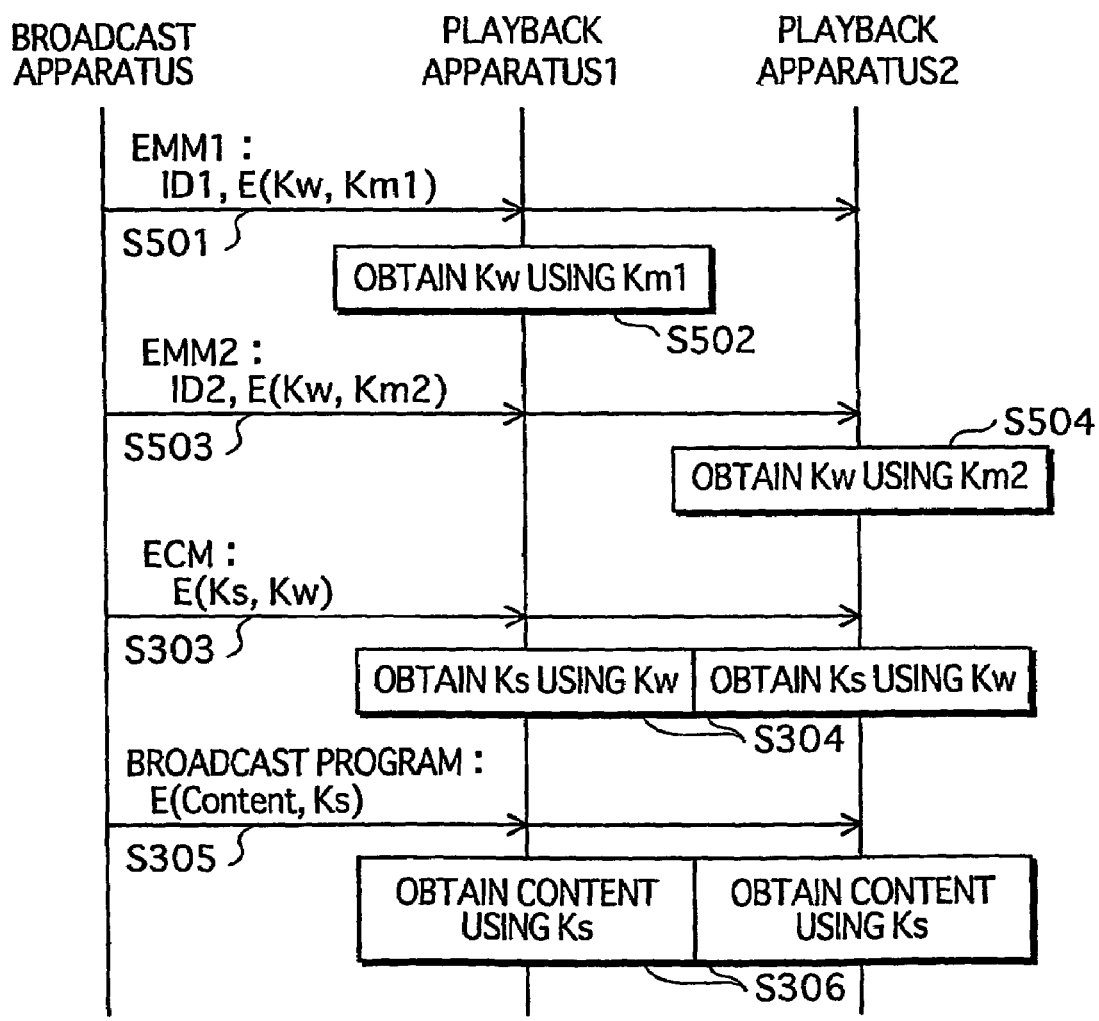
FIG. 5 shows the operation of the plurality of playback apparatus in the conventional conditional access system.
Figure 6:
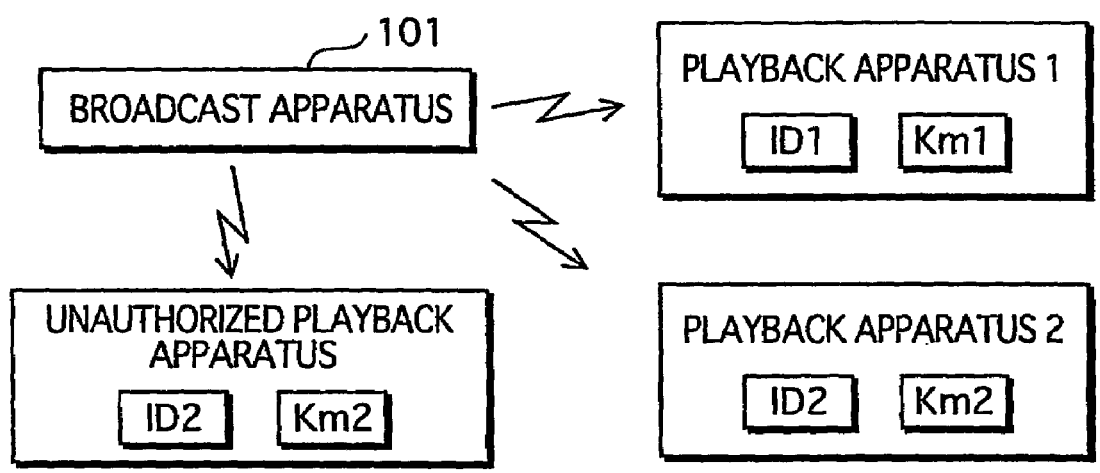
FIG. 6 shows the general structure of the conventional conditional access system in which there is an unauthorized apparatus.
Figure 7:
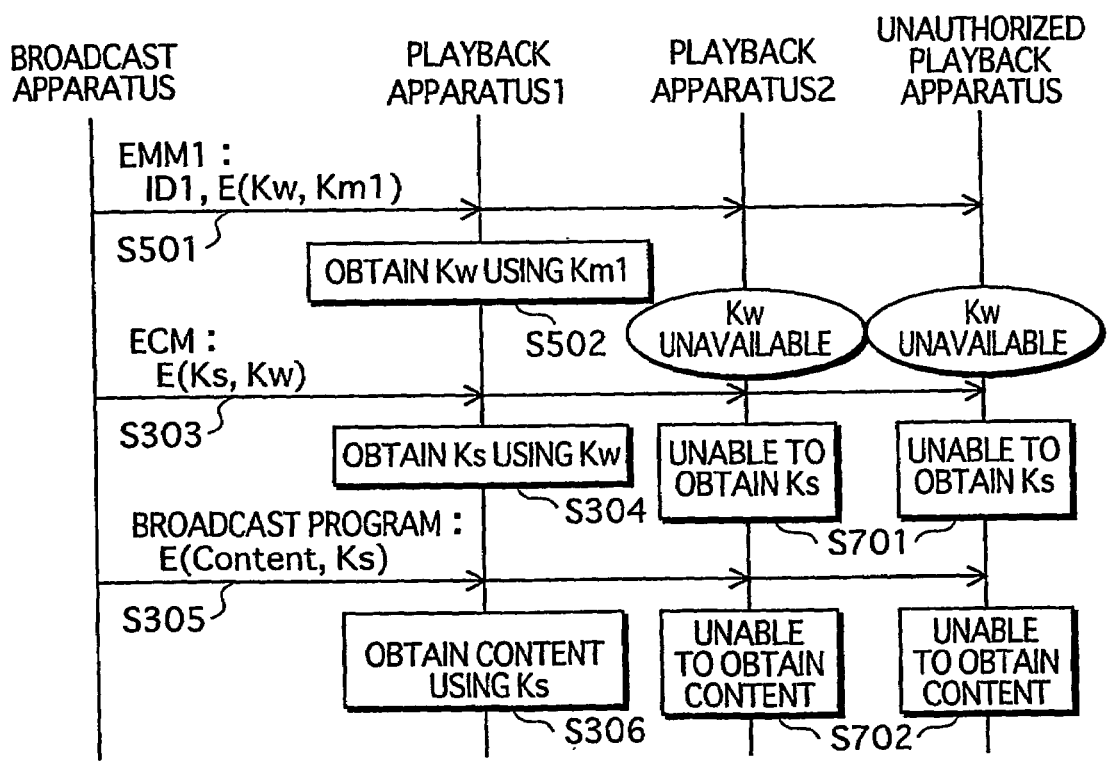
FIG. 7 shows the operation of the conventional playback apparatuses at times of preventing an unauthorized apparatus from performing unauthorized playback of contents.
Figure 8:
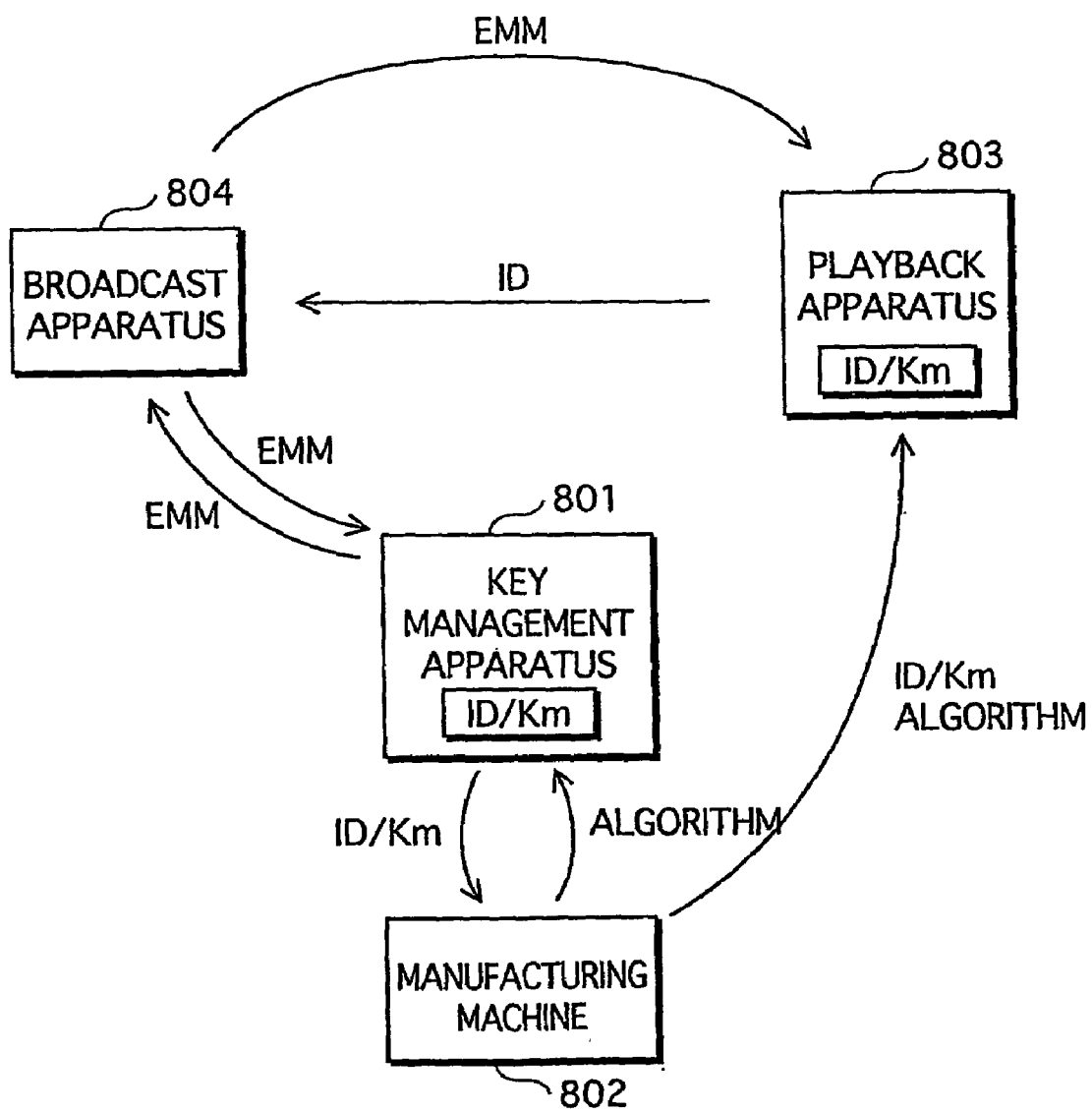
FIG. 8 shows the general structure of the conditional access system of the first embodiment.

FIG. 8 shows the general structure of the conditional access system of the first embodiment.

The conditional access system of the first embodiment comprises a key management apparatus 801, a manufacturing machine 802, a playback apparatus 803, and a broadcast apparatus 804.

Firstly, explanation is provided on how the key management apparatus 801 and the playback apparatus 803 each get to have the same ID and the same master key Km.

The key management apparatus 801 assigns an ID and a master key that are both unique to each playback apparatus, each production lot, each model, or each manufacturer, as necessary, and provides them for the manufacturing machines 802.

The manufacturing machine 802, which manufactures the playback apparatus 803, assembles the ID and the master key Km that have been assigned by the key management apparatus 801 into the playback apparatus 803, and then provides the playback apparatus 803 for a user.

This way, the key management apparatus 801 and the playback apparatus 803 each get to have the same ID and the same master key Km.

Secondly, explanation is provided on the procedure by which a user views a desired content. Here, it is assumed that, as an example, the user's playback apparatus 803 stores an ID "00000001" and a master key Km "27832529" therein.

The user makes a request for content viewing to the broadcast apparatus 804 that broadcasts the desired content. At this time, the user informs the broadcast apparatus 804 of the ID "00000001" stored in his/her playback apparatus 803.

The broadcast apparatus 804 receives the request from the user and stores the ID "00000001" and the work key Kw for the playback apparatus 803 into EMM and sends the EMM to the key management apparatus 801.

Here, the work key Kw is a key which only such playback apparatuses that are owned by users authorized to view contents are able to obtain.

The key management apparatus 801 receives the EMM from the broadcast 804, and extracts the ID "00000001" stored in the EMM. Then, the key management apparatus 801 identifies that a master key Km "27832529" corresponds to this ID and encrypts the EMM with the master key Km "27832529", before transmitting the EMM to the broadcast apparatus 804.

The broadcast apparatus 804 broadcasts the encrypted EMM.

The playback apparatus 803 selectively receives the EMM, judging from the ID stored in the EMM that this particular set of EMM has been addressed to the playback apparatus itself. In this case, the ID stored in the EMM is the ID "00000001"; therefore, the playback apparatus 803 judges that this set of EMM is addressed to the playback apparatus 803 itself. Subsequently, the playback apparatus 803 decrypts the EMM with the master key Km "27832529" and obtains a work key Kw.

This is how the broadcast apparatus 804 and the playback apparatus 803 each get to have the same work key Kw.

In addition to EMM, the broadcast apparatus 804 also broadcasts ECM that include a scrambling key Ks as well as contents scrambled by a scrambling key Ks. The playback apparatus 803 is able to obtain a scramble key Ks by decrypting ECM using the work key Kw, and is able to obtain a content by descrambling a scrambled content that has been scrambled by the scrambling key Ks.

The following explains updating of a master key Km, which is one of the characteristics of the present embodiment.

A master key Km does not need to be updated in principle; however, if the ID "00000001" and the master key Km "27832529" of the playback apparatus 803 leak to an unauthorized user, for example, then by copying and registering these ID and master key Km into his/her playback apparatus, this unauthorized user will be able to view, in an unauthorized fashion, the contents which the user of the playback apparatus 803 has been authorized to view. In this case, Updating of the master key Km becomes necessary.

Thus, the broadcast apparatus 804 stores in EMM (i) an ID of the playback apparatus that needs an update of the master key and (ii) seed information from which a new master key is to be generated and broadcasts the EMM. Then, the playback apparatus in need of an updated master key generates a new master key from the seed information.

Here, the algorithm used to generate a new master key from seed information is determined at the time of manufacturing a playback apparatus and is assembled into the playback apparatus in a secure state. The same algorithm has also been assembled into a key management apparatus in a secure state. It means that since only the key management apparatus and the playback apparatus of an authorized user store the same algorithms, only the key management apparatus and the playback apparatus of the authorized user are able to have the same new master keys.

Accordingly, the conditional access system of the present embodiment is able to eliminate unauthorized viewing of contents by unauthorized users after the master keys are updated.

The following explains in detail the playback apparatus and the key management apparatus which are used to actualize such a conditional access system.

Structure of Playback Apparatus

Figure 9:
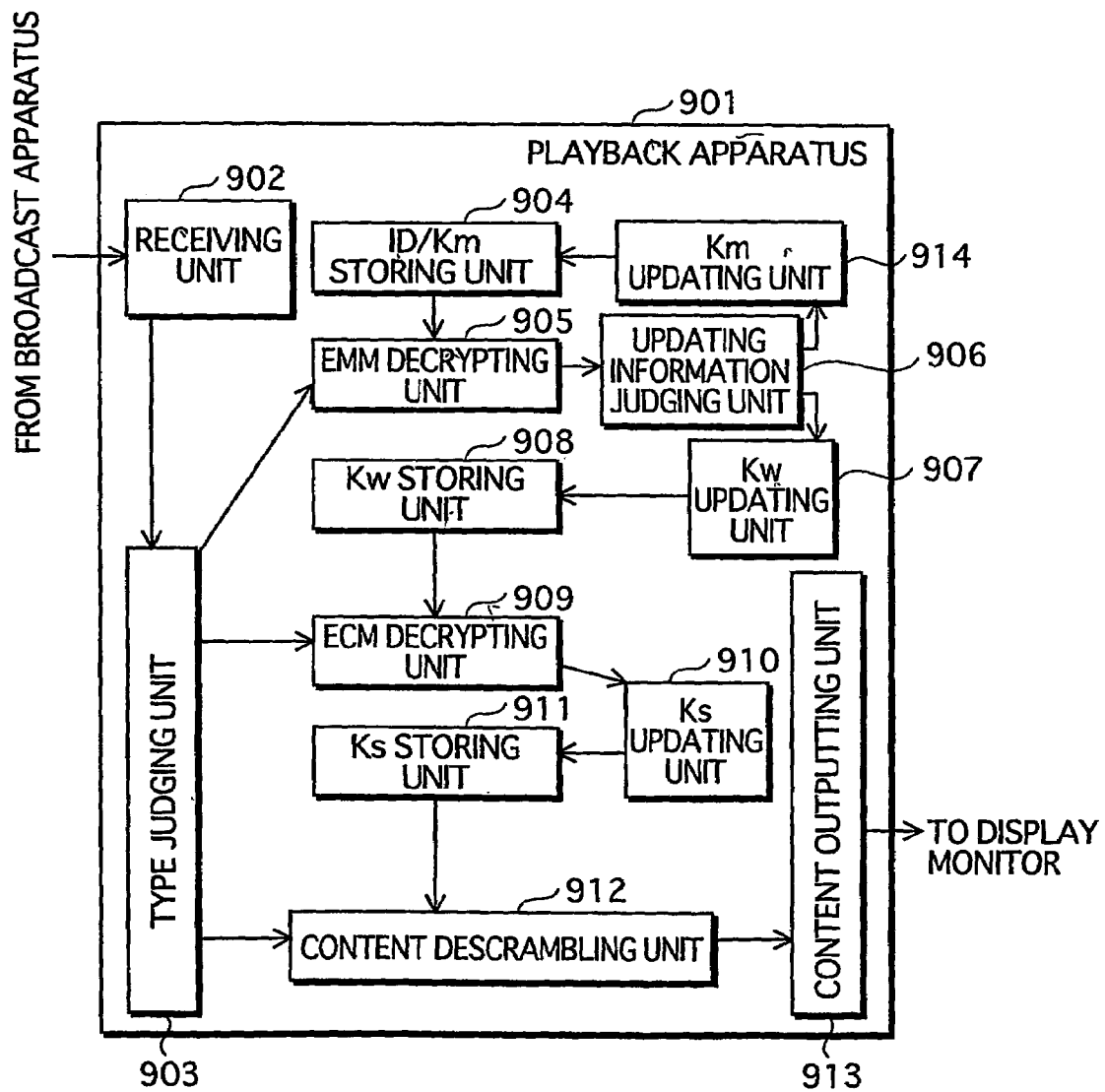
FIG. 9 shows the structure of the playback apparatus in the conditional access system.

FIG. 9 shows the structure of the playback apparatus in the conditional access system.

The playback apparatus 901 comprises a receiving unit 902, a type judging unit 903, an ID/Km storing unit 904, an EMM decrypting unit 905, an updating information judging unit 906, a Kw updating unit 907, a Kw storing unit 908, an ECM decrypting unit 909, a Ks updating unit 910, a Ks storing unit 911, a content descrambling unit 912, a content outputting unit 913, and a Km updating unit 914.

The receiving unit 902 receives various kinds of information including scrambled contents, ECM and EMM from the broadcast apparatus.

The type judging unit 903 transfers information to different units depending on what type of information it is, for example, it transfers scrambled contents to the content descrambling unit 912, ECM to the ECM decrypting unit 909, and EMM to the EMM decrypting unit 905.

The ID/Km storing unit 904 stores an ID and a master key that are unique to the playback apparatus 901, and inputs the master key Km to the EMM decrypting unit 905, as necessary. The initial value of the master key Km is the one that has been assembled into the playback apparatus by the manufacturer and gets updated by the Km updating unit 914, as necessary.

The EMM decrypting unit 905 decrypts EMM using the master key Km and inputs the decrypted EMM to the updating information judging unit 906.

The updating information judging unit 906, according to the identifier included in the EMM, judges whether the EMM stores seed information for updating the master key Km or a new work key for updating the work key. The identifier will be explained later.

When a work key Kw is stored, the updating information judging unit 906 inputs the work key Kw to the Kw updating unit 907. When seed information is stored, the updating information judging unit 906 inputs the seed information to the Km updating unit 914.

The Kw updating unit 907 obtains the work key Kw from the updating information judging unit 906 and updates the existing work key. A work key is usually updated by being overwritten; however, it is also acceptable to update a work key by making an addition to it.

The Kw storing unit 908 stores the work key Kw updated by the Kw updating unit 907, and inputs the work key Kw to the ECM decrypting unit 909, as necessary.

The ECM decrypting unit 909 decrypts ECM using the work key Kw and inputs a new scrambling key Ks stored in the ECM to the Ks updating unit 910.

The Ks updating unit 910 obtains the scrambling key Ks from the ECM decrypting unit 909 and updates the existing scrambling key Ks. A scrambling key is usually updated by being overwritten; however, it is also acceptable to update a scrambling key by making an addition to it.

The Ks storing unit 911 stores the scrambling key Ks updated by the Ks updating unit 910 and inputs the scrambling key Ks to the content descrambling unit 912, as necessary.

The content descrambling unit 912 descrambles scrambled contents using the scrambling key Ks and inputs the descrambled contents to the content outputting unit 913.

The content outputting unit 913 transmits the content to the display monitor.

The Km updating unit 914 obtains the seed information from the updating information judging unit 906 and updates the master key Km using the seed information. A master key is usually updated by being overwritten; however, it is also acceptable to update a master key by making an addition to it. When an addition is made to a master key, the ID/Km storing unit 904 will be able to store all master keys that are there prior to updates as well as the current master key. Thus, in case the current master key is unusable due to an error, it will be possible to use one of the master keys prior to updates instead. It is further acceptable if the ID/Km storing unit 904 stores only the initial master key in addition to the current master key.

Furthermore, it is also acceptable to update the master key and the ID at the same time. It is also acceptable to use part of an ID as a generation number and update the generation of a combination of an ID and a master key. In such a case, the ID may be updated by being overwritten or by having an addition made to it.

Figure 10:
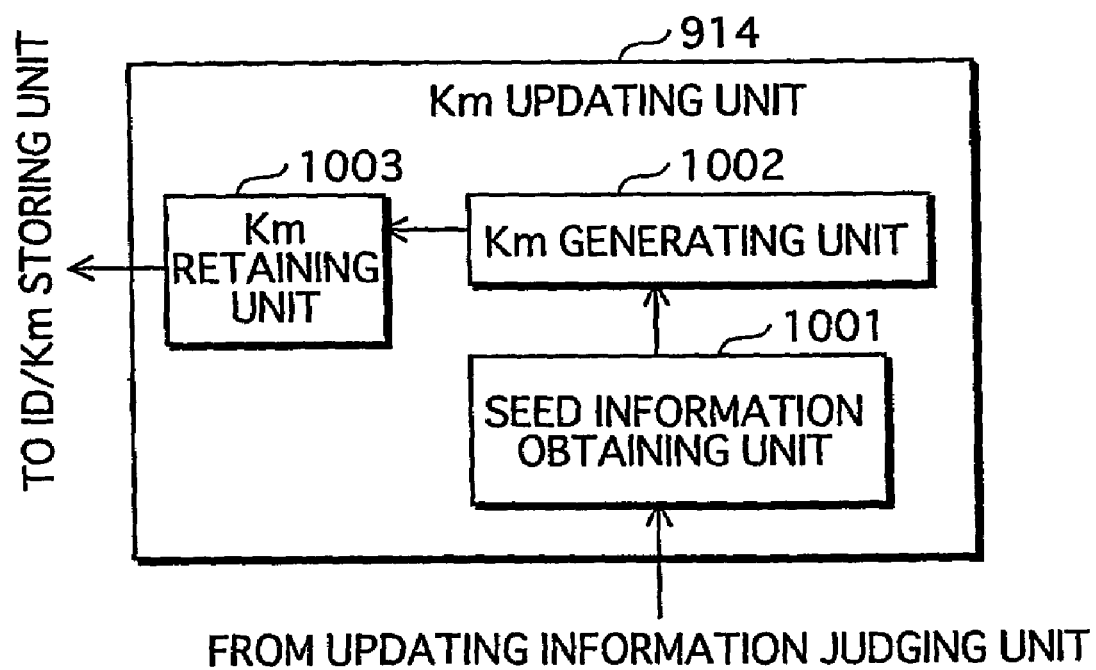
FIG. 10 shows the detailed structure of the Km updating unit in the first embodiment.

FIG. 10 shows the detailed structure of the Km updating unit in the first embodiment.

The Km updating unit 914 comprises a seed information obtaining unit 1001, a Km generating unit 1002, and a Km retaining unit 1003.

The seed information obtaining unit 1001 obtains the seed information from the updating information judging unit and inputs the seed information to the Km generating unit 1002 as an argument in the algorithm used for generating a master key.

The Km generating unit 1002 generates a new master key Km' using the algorithm having been assembled into the Km generating unit 1002 itself. The algorithm is unique to each playback apparatus, each production lot, each model, or each manufacturer. The same algorithm is also stored in the key management apparatus.

The Km retaining unit 1003 retains the master key Km in a form in which the ID/Km storing unit 904 will be able to store it.

This way, the playback apparatus 901 is able to update the master key Km using the EMM broadcasted from the broadcast apparatus.

The Km updating unit 914 has two possibilities as will be mentioned below depending on at which point of time a new master key is generated, and it could be either way.

The first possibility is that a new master key is generated as soon as the seed information is obtained.

The second possibility is that the seed information is obtained and stored till it is necessary to generate a new master key. In this case, a new master key may be generated, for example, after EMM are inputted to the EMM decrypting unit, and then a signal transmitted from the EMM decrypting unit is received.

The following explains the data structure of EMM.

Figure 11:
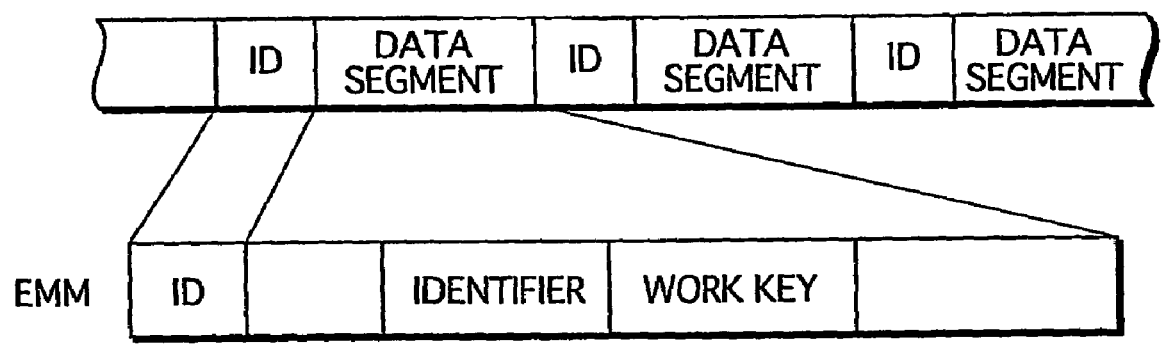
FIG. 11 shows the data structure of normal EMM.

FIG. 11 shows the data structure of normal EMM.

EMM are made up of an ID segment and a data segment. The ID segment stores an ID of the playback apparatus that is to receive this particular set of EMM. The playback apparatus is therefore able to selectively decrypt only EMM in which the ID of the playback apparatus is stored, among different sets of EMM broadcasted from the broadcast apparatus.

The data segment stores an identifier and key information. The identifier identifies the key information stored in the data segment as either a work key or seed information. For instance, it could be arranged so that when the identifier is "0x01", a work key is stored, and when the identifier is "0x02", seed information is stored.

The data segment also stores other items such as an information length, a protocol number, an expiration date, but explanation on these items will be omitted.

FIG. 12 shows the data structure of EMM for updating a master key Km.

A set of EMM for updating a master key Km is also made up of an ID segment and a data segment like the normal EMM.

The data segment stores an identifier and seed information.

The seed information is information from which a new master key is to be generated and could be, for example, a generation number of the master key, random numbers, or a combination of these.

Figure 13A:
FIGS. 13A and 13B show examples of algorithms used in the Km generating unit.
Figure 13B:
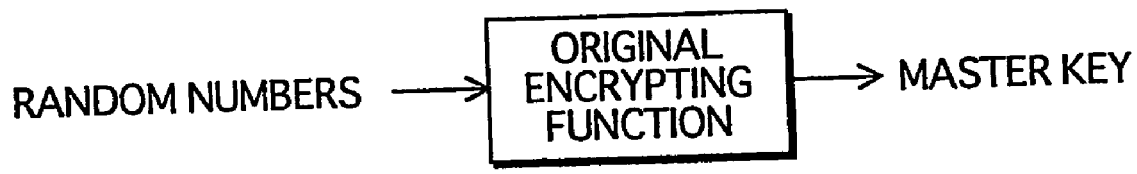

FIGS. 13A and 13B show examples of algorithms used in the Km generating unit.

FIG. 13A indicates a method where a master key is obtained from the ID and the generation number of the playback apparatus, with use of an original hash function.

FIG. 13B indicates a method where a master key is obtained by encrypting random numbers generated in the key management apparatus with use of an original encrypting function.

Methods for generating a new master key is not limited to the ones mentioned here as long as the playback apparatus and the key management apparatus are each able to own a new master key securely. It is acceptable, for example, to generate a new master key by inputting the ID, the generation number and the seed information into an original hash function that is unique to each manufacturer.

Operation of Playback Apparatus

Figure 14:
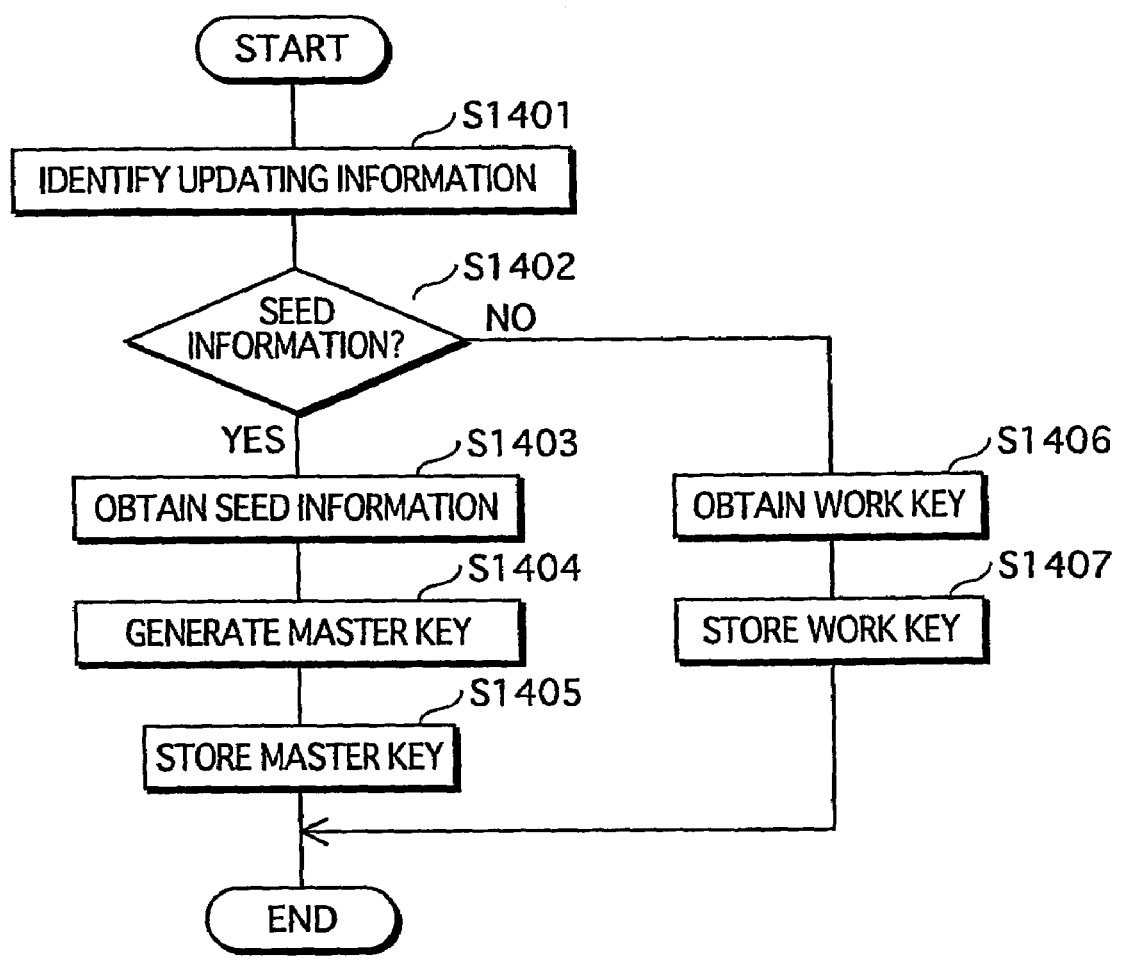
FIG. 14 shows the operation of the playback apparatus in the conditional access system.

FIG. 14 shows the operation of the playback apparatus in the conditional access system.

The playback apparatus receives various kinds of information including scrambled contents, ECM, and EMM from the broadcast apparatus. The following explains only a case where EMM are received.

When the playback apparatus receives EMM, it is judged whether a work key is included or seed information is included from the identifier stored in the EMM (S1401).

If seed information is included in the EMM (S1402, Y) the playback apparatus obtains the seed information included in the EMM (S1403).

The playback apparatus then generates a new master key from the seed information (S1404).

The playback apparatus stores the master key generated in Step S1404 and uses it starting from the next occasion (S1405).

If a work key is included in the EMM at Step S1402 (S1402, N), the playback apparatus obtains the work key (S1406).

The playback apparatus stores the work key decrypted in Step S1406 so that it can be used starting from the next occasion of receiving ECM (S1407).

So far, explanation is provided as to the structure and the operation of the playback apparatus that is able to generate a new master key from the seed information stored in EMM. The following explains how a key management apparatus is able to have the same new master key as the playback apparatus does.

Structure of the Key Management Apparatus

Figure 15:
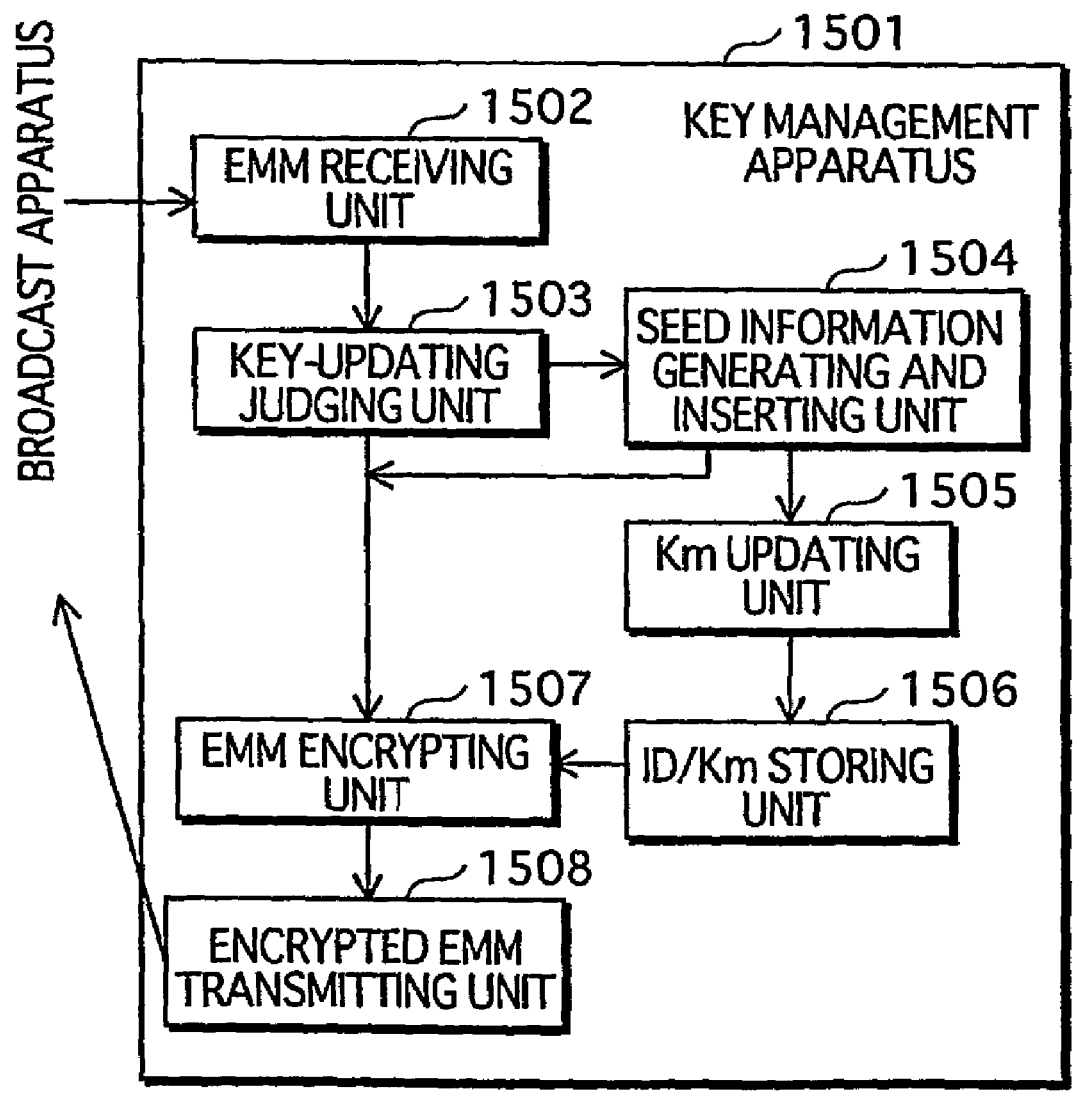
FIG. 15 shows the structure of the key management apparatus in the conditional access system.

FIG. 15 shows the structure of the key management apparatus in the conditional access system.

The key management apparatus 1501 comprises an EMM receiving unit 1502, a key-updating judging unit 1503, a seed information generating and inserting unit 1504, a Km updating unit 1505, an ID/Km storing unit 1506, an EMM encrypting unit 1507, and an encrypted EMM transmitting unit 1508.

The EMM receiving unit 1502 receives EMM transmitted from the broadcast apparatus and inputs the EMM to the key-updating judging unit 1503.

The key-updating judging unit 1503 judges if the EMM include some information which indicates that the master key needs to be updated. More specifically, if it is arranged so that an identifier "0x02" means "the master key needs to be updated", then the key-updating judging unit 1503 checks if the identifier is "0x02" or not. When the identifier is "0x02", the key-updating judging unit notifies the seed information generating and inserting unit 1504 of the fact. The EMM will be inputted to the EMM encrypting unit 1507.

The seed information generating and inserting unit 1504 receives the notification from the key-updating judging unit 1503, generates seed information, inserts it into the EMM, and also inputs the seed information to the Km updating unit 1505. The seed information is information from which a new master key is to be generated and could be, for example, a generation number of the master key or random numbers.

The Km updating unit 1505 obtains the seed information from the seed information generating and inserting unit 1504 and updates the master key Km using the seed information. Here, the algorithm used to generate the new master key from the seed information is stored in the playback apparatus as well.

The ID/Km storing unit 1506 stores an ID and a master key Km that are unique to each playback apparatus, each production lot, each model, or manufacturer, and inputs the master key Km to the EMM encrypting unit 1507, as necessary. The initial value of the master key Km is the one that has been assembled into the playback apparatus at the time of manufacturing, and gets updated by the Km updating unit 1505, as necessary.

The EMM encrypting unit 1507 encrypts the EMM using the master key Km and inputs the encrypted EMM to the encrypted EMM transmitting unit 1508.

The encrypted EMM transmitting unit 1508 transmits the encrypted EMM to the broadcast apparatus.

The EMM for transmitting seed information therein gets encrypted with use of the old master key before being updated. The new master key after the update will be used starting from the next occasion of encrypting EMM.

As so far explained, the key management apparatus (i) generates seed information and inserts it into the EMM, (ii) transmits the seed information to the playback apparatus via the broadcast apparatus, and (iii) updates the master key Km with use of the seed information. The playback apparatus, on the other hand, updates the master key with use of the seed information having been transmitted. Here, since the key management apparatus and the playback apparatus each own the same algorithm that is used to generate a master key from seed information, the key management apparatus and the playback apparatus each get to own the same new master key.

FIG. 16 shows an example of management of IDs and master keys Kms by the key management apparatus.

The key management apparatus manages all IDs and master keys Kms together at the ID/Km storing unit using a management table shown in FIG. 16. In the management table, different IDs are arranged in the row direction, and different generations of the master keys Kms are arranged in the column direction.

When the key management apparatus assigns an ID and a master key to a manufacturing machine, these ID and master key Km are added to this management table. At first, a master key is added to the column of the first generation, and every time the master key is updated, a new master key is added to the next column, starting with the column of the second generation and then to the column of the third generation.

The reason that all master keys including the ones in the past are stored can be explained as follows:

When a same ID is assigned to each playback apparatus of the same model, all the playback apparatuses will not necessarily be successful in updating their master keys after the first transmission of updating information. It is therefore necessary to transmit, to those playback apparatuses that have not been successful in updating their master keys, updating information that has been encrypted with use of a master key from the past.

Operation of the Key Management Apparatus

Figure 17:
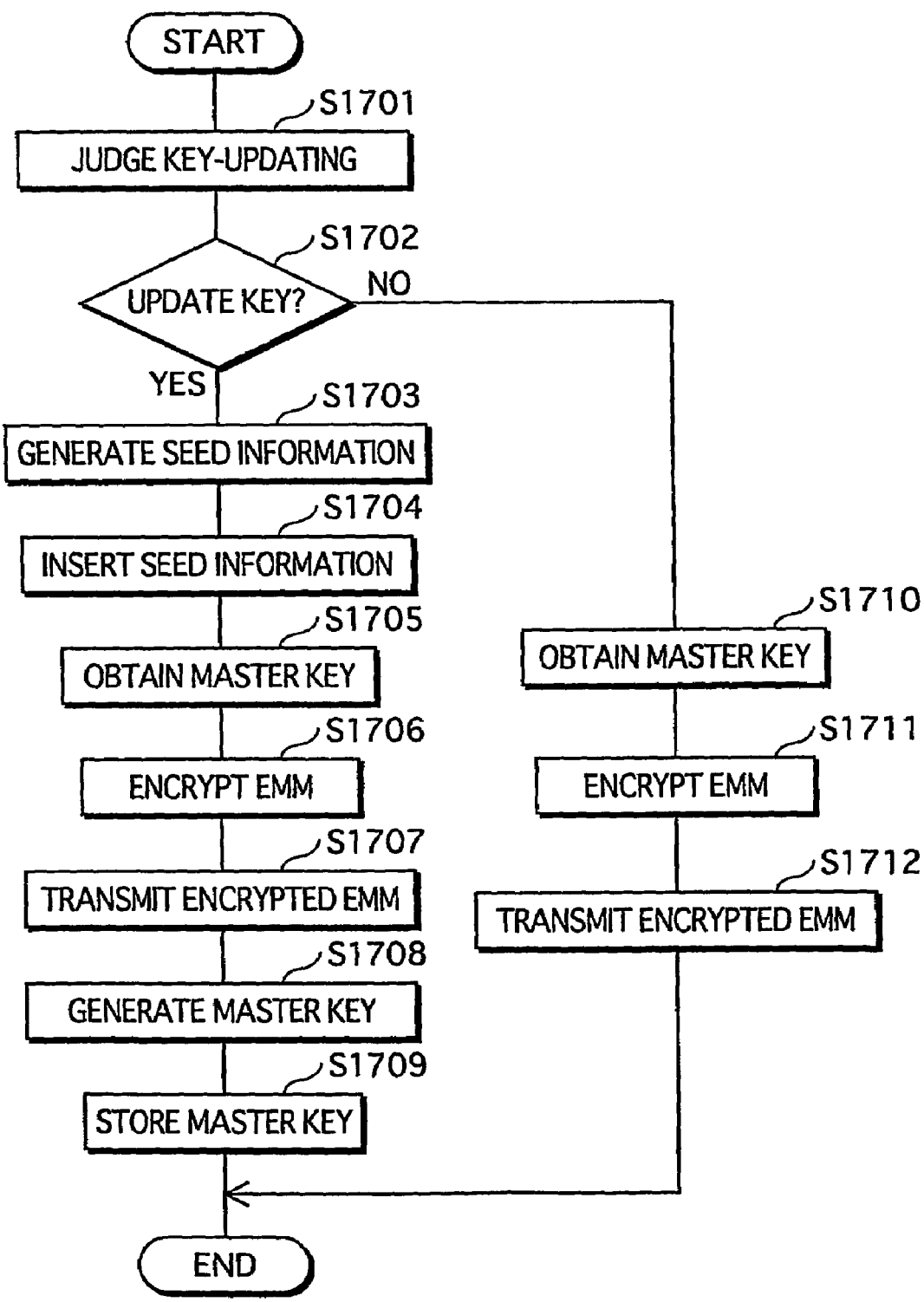
FIG. 17 shows the operation of the key management apparatus in the conditional access system.

FIG. 17 shows the operation of the key management apparatus in the conditional access system.

When receiving EMM from the broadcast apparatus, the key management apparatus judges whether a secret key needs to be updated or not from the identifier included in the EMM (S1701).

If the master key needs to be updated (S1702, Y), the key management apparatus generates seed information (S1703), and inserts the seed information into the EMM (S1704).

The key management apparatus obtains the master key stored in the ID/Km storing unit (S1705), and encrypts the EMM using the master key (S1706).

Then, the key management apparatus transmits the encrypted EMM to the broadcast apparatus (S1707).

After transmitting the encrypted EMM to the broadcast apparatus in Step S1707, the key management apparatus generates a new master key using the seed information generated in Step S1703 (S1708).

The key management apparatus stores the new master key generated in Step S1708 and uses the new master key starting from the next occasion (S1709).

If the master key does not need to be updated in Step S1702 (S1702, N), the key management apparatus obtains the master key stored in the ID/Km storing unit (S1710), and encrypts the EMM using the master key (S1711).

Then, the key management apparatus transmits the encrypted EMM to the broadcast apparatus (S1712).

Operation of the Conditional Access System

The following describes the operation of the conditional access system that includes the playback apparatus and the key management apparatus mentioned above. This embodiment is characterized with the operation by which it is possible to eliminate content viewing by an unauthorized playback apparatus, when it has been learned that there is an unauthorized playback apparatus which disguises itself as an authorized playback apparatus. The following explains this particular operation.

Figure 18:
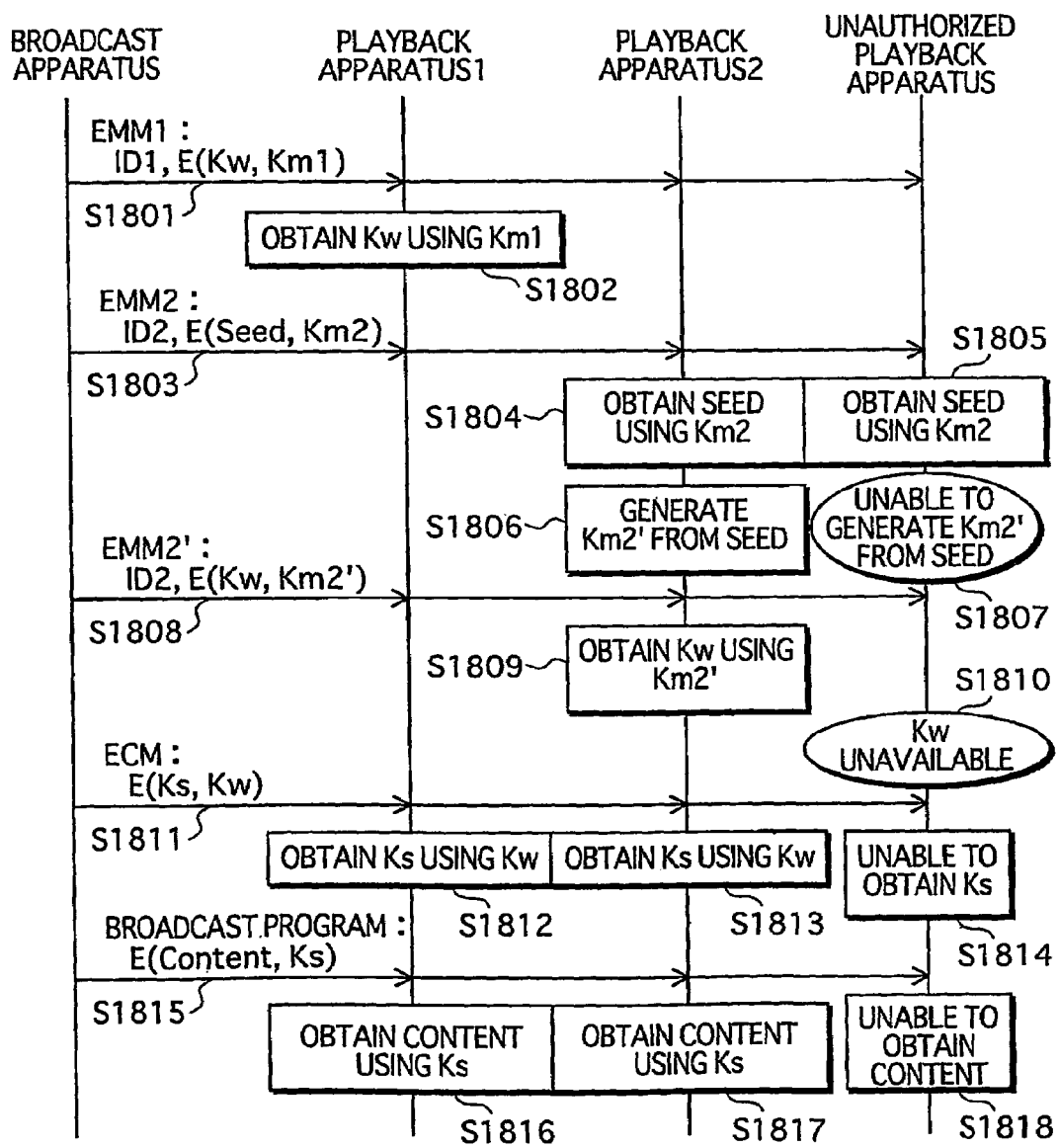
FIG. 18 shows the operation of the playback apparatuses at times of eliminating unauthorized content viewing by an unauthorized apparatus.

FIG. 18 shows the operation of the playback apparatuses at times of eliminating unauthorized content viewing by an unauthorized apparatus.

The playback apparatus 1 is owned by the user 1 authorized to view contents and stores ID 1 and a master key Km1. In the same manner, the playback apparatus 2 is owned by the user 2 authorized to view contents and stores ID2 and a master key Km2. The unauthorized playback apparatus is disguising itself as the playback apparatus 2 and stores ID2 and a master key Km2.

The following explains the procedure in which the broadcast apparatus finds out that there is an unauthorized playback apparatus and eliminates the content viewing by the unauthorized playback apparatus.

The broadcast apparatus transmits EMM 1 to the playback apparatus 1 (S1801).

Generally speaking, EMM include (i) the ID of a playback apparatus that is to receive this particular set of EMM and (ii) an encrypted work key E(Kw, Km) which is a work key Kw encrypted with a master key Km. Accordingly, EMM 1 include the ID1 and an encrypted work key E(Kw, Km1).

The playback apparatus 1 judges that this particular set of EMM is addressed to the playback apparatus 1 itself from the ID1 included in the EMM 1, and decrypts E(Kw, Km1) using the Km1 stored in the playback apparatus 1 itself. As a result, the playback apparatus 1 obtains the work key Kw (S1802).

The broadcast apparatus transmits EMM 2 to the playback apparatus 2 (S1803).

The EMM2 include the ID2 and encrypted seed information E (Seed, Km2). The encrypted seed information E(Seed, Km2) is seed information "Seed" that has been encrypted using the master key Km2.

The playback apparatus 2 judges that this particular set of EMM is addressed to the playback apparatus 2 itself from the ID2 included in the EMM 2, and decrypts E(Seed, Km2) using the Km2 stored in the playback apparatus 2 itself. As a result, the playback apparatus 2 obtains the seed information "Seed" (S1804).

The unauthorized playback apparatus also judges that this particular set of EMM is addressed to the unauthorized playback apparatus itself from the ID2 included in the EMM 2 and decrypts E(Seed, Km2) using the Km2 stored in the unauthorized playback apparatus itself. As a result, the unauthorized playback apparatus obtains the seed information "Seed" (S1805).

The playback apparatus 2 generates a new master key Km2' from the seed information "Seed" (S1806). The algorithm used to generate the master key Km2' from the seed information "Seed" is unique to each playback apparatus, each production lot, each model, or each manufacturer. As storing the same algorithm, the key management apparatus is also able to generate the master key Km2' from the seed information "Seed". Consequently, the playback apparatus 2 and the key management apparatus are each able to own the same new master key Km2'.

On the other hand, the unauthorized playback apparatus does not have the algorithm used to generate the master key Km2' from the seed information "Seed", and is therefore not able to generate a master key Km2' (S1807).

The broadcast apparatus transmits EMM2' to the playback apparatus 2 (S1808).

Here the EMM2' include ID2 and an encrypted work key E(Kw, Km2').

The playback apparatus 2 judges that this particular set of EMM is addressed to the playback apparatus 2 itself from the ID2 included in the EMM 2, and decrypts E(Kw, Km2') using the Km2' stored in the playback apparatus 2 itself. As a result, the playback apparatus 2 obtains a work key Kw (S1809).

On the other hand, the unauthorized playback apparatus also judges that this particular set of EMM is addressed to the unauthorized playback apparatus itself from the ID2 included in the EMM 2, but is not able to obtain a work key Kw because the unauthorized playback apparatus does not store the master key Km2' (S1810).

The broadcast apparatus transmits ECM to both the playback apparatus 1 and the playback apparatus 2. (S1811).

ECM include an encrypted scrambling key E(Ks, Kw) which is a scrambling key Ks encrypted with a work key Kw.

The playback apparatus 1 receives the ECM and decrypts E(Ks, Kw) using the work key Kw obtained in Step S1802. As a result, the playback apparatus 1 obtains the scrambling key Ks (S1812).

The playback apparatus 2 receives the ECM and decrypts E(Ks, Kw) using the work key Kw obtained in Step S1809. As a result, the playback apparatus 2 obtains the scrambling key Ks (S1813).

On the other hand, the unauthorized playback apparatus is not able to obtain the work key Kw in Step S1810, and is therefore not able to obtain the scrambling key Ks, either (S1814).

The broadcast apparatus transmits a scrambled content to each of the playback apparatus 1 and the playback apparatus 2 (S1815).

The scrambled content E(Content, Ks) is a content scrambled with a scrambling key Ks.

The playback apparatus 1 descrambles E(Content, Ks) using the scrambling key Ks obtained in Step S1812. As a result, the playback apparatus 1 obtains the content (S1816).

The playback apparatus 2 descrambles E(Content, Ks) using the scrambling key Ks obtained in Step S1813. As a result, the playback apparatus 2 obtains the content (S1817).

On the other hand, the unauthorized playback apparatus is not able to obtain the scrambling key Ks in Step S1814, and is therefore not able to obtain the content, either (S1818).

In this manner, when it is learned that there is an unauthorized playback apparatus which disguises itself as an authorized playback apparatus, the broadcast apparatus updates the master keys owned by both the key management apparatus and the playback apparatuses, and is therefore able to eliminate the content viewing by the unauthorized playback apparatus.

Also, in this embodiment, since the master keys are updated with use of EMM that are transmitted by broadcast, it takes fewer days to update the master keys than in the case where portable media such as IC cards are used for the transmission. Accordingly, an authorized user will not suffer a loss of privilege to view desirable contents that may be caused before the portable medium arrives.

Further, the key management apparatus does not need to bear the cost of sending a portable medium to all playback apparatuses that need one, even if an ID and a master key Km are assigned to each production lot, each model, or each manufacturer, instead of to each playback apparatus.

Second Embodiment

General Structure of the Conditional Access System

Figure 19:
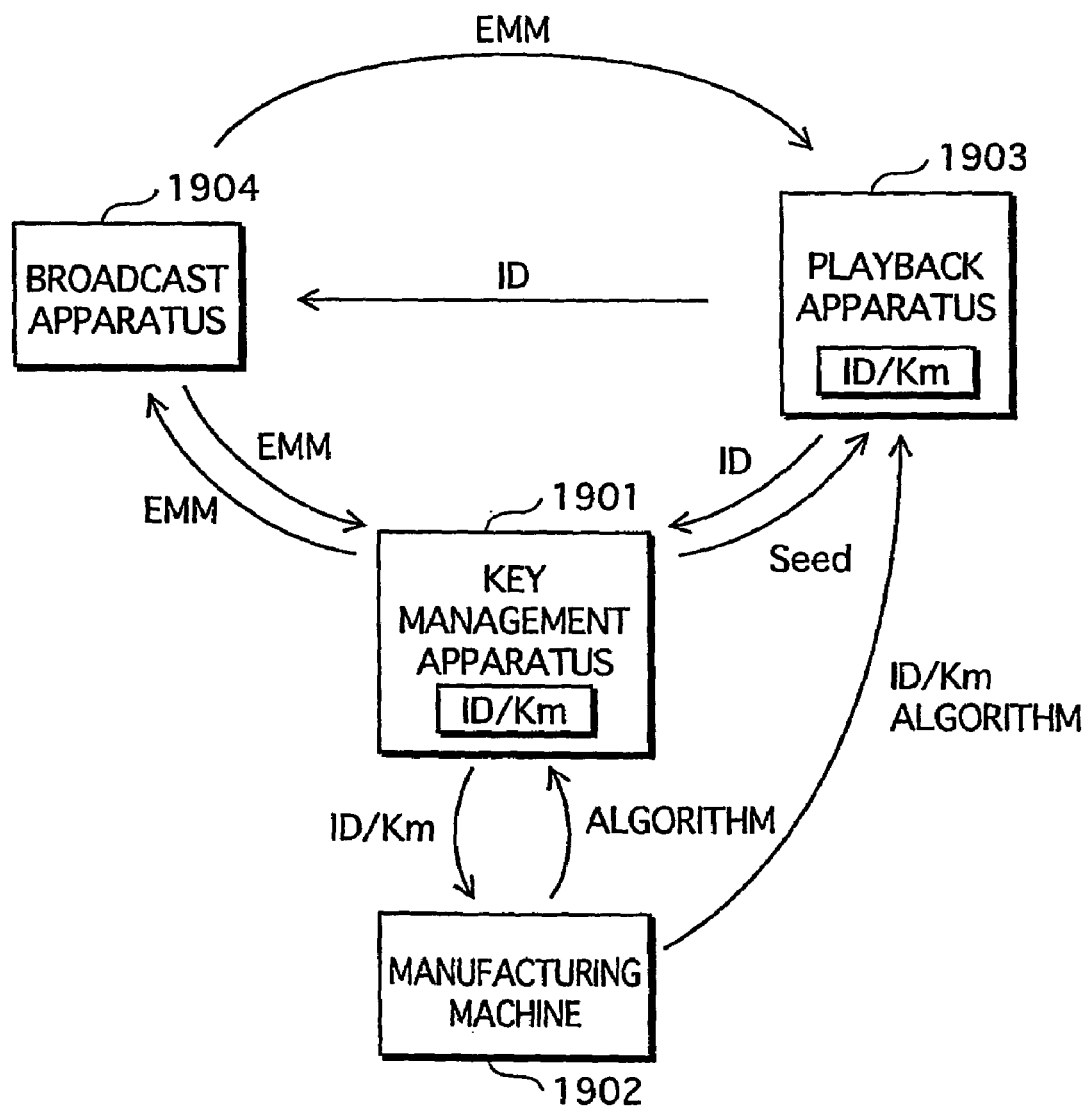
FIG. 19 shows the general structure of the conditional access system of the second embodiment.

FIG. 19 shows the general structure of the conditional access system of the second embodiment.

The conditional access system of the second embodiment comprises a key management apparatus 1901, a manufacturing machine 1902, a playback apparatus 1903, and a broadcast apparatus 1904.

The procedure in which both the key management apparatus 1901 and the playback apparatus 1903 each own the same ID and the same master key Km and the procedure in which the playback apparatus 1903 obtains a work key Kw are the same as in the first embodiment.

The second embodiment differs from the first embodiment in the method of updating the master key Km.

In the second embodiment, the master key Km is updated in the following manner:

The broadcast apparatus 1904 stores in EMM (i) an ID of the playback apparatus that needs an update of the master key and (ii) trigger information which indicates that the master key needs to be updated, and broadcasts the EMM. Then, the playback apparatus in need of an updated master key realizes that the master key Km needs to be updated due to the updating information and transmits apparatus information such as its own ID to the key management apparatus 1901. The key management apparatus 1901 transmits to the playback apparatus seed information from which a new master key is to be generated. The playback apparatus updates the master key Km using the seed information.

Here, since only the key management apparatus and the playback apparatuses of the authorized users store the same algorithms used to generate the new master key Km's from the seed information, only the key management apparatus and the playback apparatuses of the authorized users are able to have the same new master keys Km's. Accordingly, the conditional access system of the present embodiment is able to eliminate unauthorized viewing of contents by unauthorized users after the master keys are updated.

In the first embodiment, seed information is stored in EMM, and the EMM get transmitted. The second embodiment is different from the first embodiment in that EMM transmitted stores trigger information that merely initiates the update of the master key, and seed information is transmitted in some other way than in EMM.

The following explains in detail a playback apparatus that actualizes such a conditional access system.

Structure of the Playback Apparatus

The playback apparatus of the second embodiment is different from the playback apparatus of the first embodiment in only the Km updating unit. Thus, only the Km updating unit will be explained, and explanation on other parts of the structure will be omitted.

Figure 20:
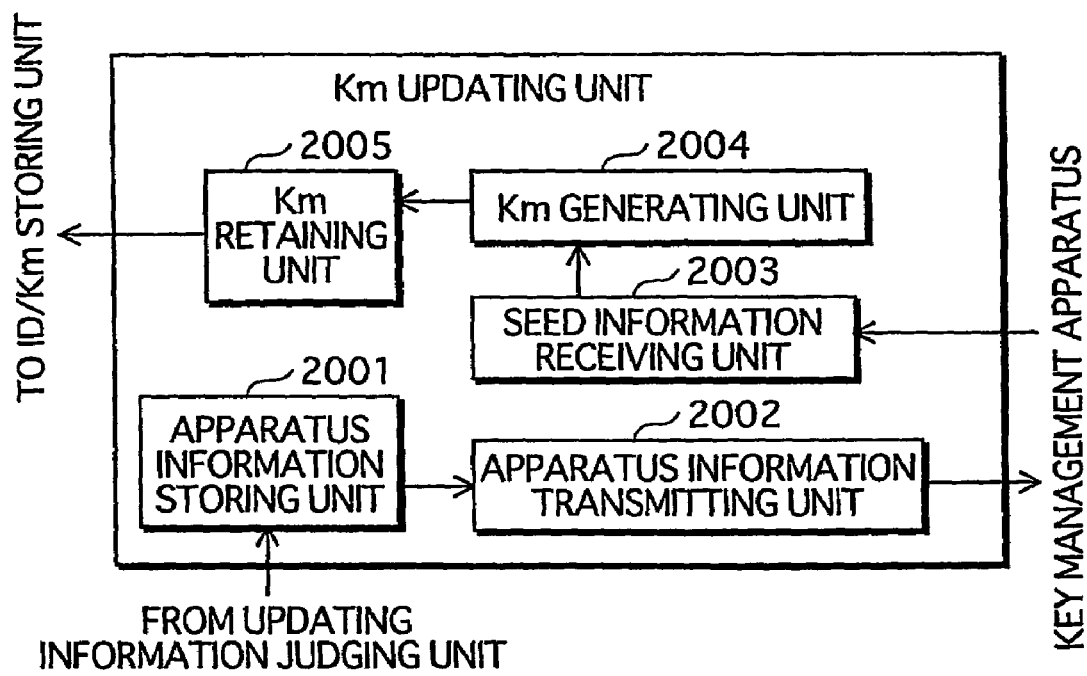
FIG. 20 shows the detailed structure of the Km updating unit in the second embodiment.

FIG. 20 shows the detailed structure of the Km updating unit in the second embodiment.

The Km updating unit comprises an apparatus information storing unit 2001, an apparatus information transmitting unit 2002, a seed information receiving unit 2003, a Km generating unit 2004, and a Km retaining unit 2005.

The apparatus information storing unit 2001 stores apparatus information that is unique to the playback apparatus such as an ID, and inputs the apparatus information to the apparatus information transmitting unit 2002 according to the notification from the updating information judging unit.

The apparatus information transmitting unit 2002 transmits the apparatus information stored in the apparatus information storing unit 2001 to the key management apparatus as a request signal requesting seed information. In response to the apparatus information having been received, the key management apparatus transmits seed information in return.

The seed information receiving unit 2003 receives the seed information and inputs the seed information to the Kr generating unit 2004 as an argument in the algorithm used for generating a master key. Here, the apparatus information and the seed information are transferred via a telephone line.

The Km generating unit 2004 generates a new master key Km' using the algorithm having been assembled into the Km generating unit 2004 itself. The algorithm is unique to each playback apparatus, each production lot, each model, or each manufacturer. The same algorithm is also stored in the key management apparatus.

The Km retaining unit 2005 retains the master key Km.

In this embodiment again, there are two possibilities as will be mentioned below depending on at which point of time a new master key is generated, and it could be either way.

The first possibility is that a new master key is generated as soon as the seed information is obtained.

The second possibility is that the seed information is obtained and stored till it is necessary to generate a new master key. In this case, a new master key may be generated, for example, after EMM are inputted to the EMM decrypting unit, and then a signal transmitted from the EMM decrypting unit is received.

Figure 21:
FIG. 21 shows the data structure of EMM for updating a master key Km.

FIG. 21 shows the data structure of EMM for updating a master key Km.

In this embodiment, an identifier is stored in the data segment, and this identifier itself is trigger information.

Structure of Key Management Apparatus

Figure 22:
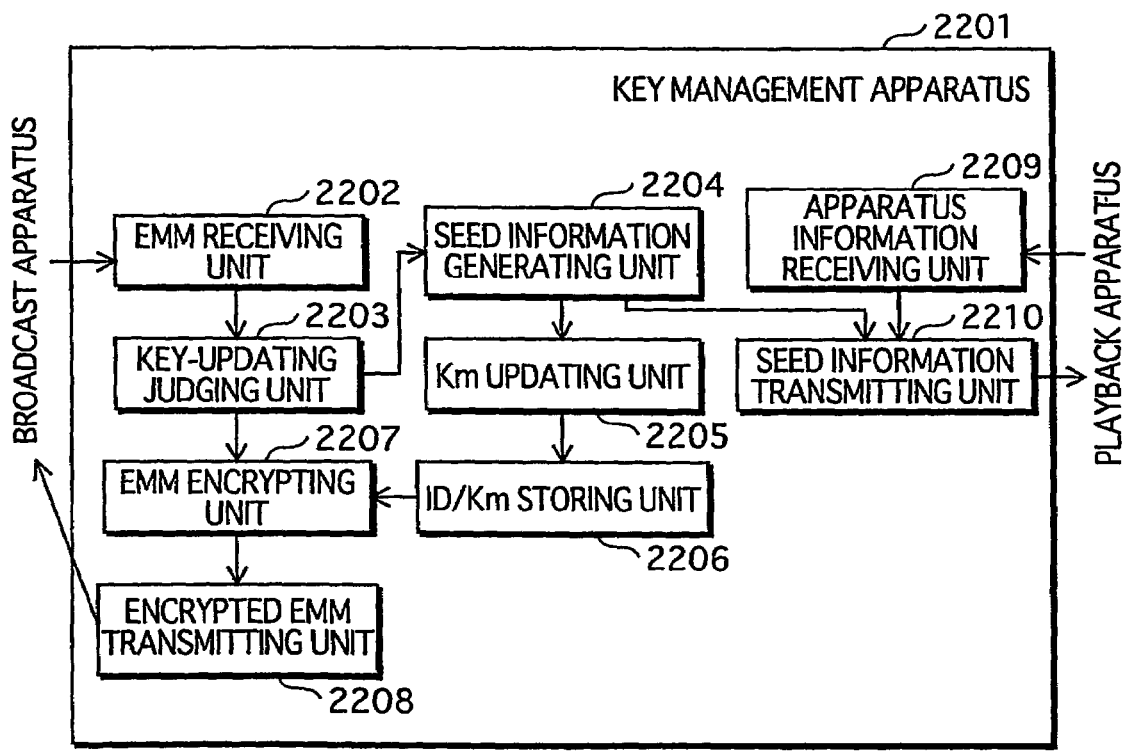
FIG. 22 shows the structure of the key management apparatus in the conditional access system.

FIG. 22 shows the structure of the key management apparatus in the conditional access system.

The key management apparatus 2201 comprises an EMM receiving unit 2202, a key-updating judging unit 2203, a seed information generating unit 2204, a Km updating unit 2205, an ID/Km storing unit 2206, an EMM encrypting unit 2207, an encrypted EMM transmitting unit 2208, apparatus information receiving unit 2209 and seed information transmitting unit 2210.

The key management apparatus in the second embodiment is different from the one in the first embodiment in the seed information generating unit 2204, the apparatus information receiving unit 2209, and the seed information transmitting unit 2210. Thus, only these different parts of the structure will be explained, and explanation on the same structure will be omitted.

The seed information generating unit 2204 receives notification from the key-updating judging unit 2203, generates seed information, and inputs the seed information to the Km updating unit 2205 as well as to the seed information transmitting unit 2210. The seed information is information from which a new master key is to be generated, and could be, for example, a generation number of the master key Km or random numbers.

The apparatus information receiving unit 2209 receives apparatus information such as an ID from a playback apparatus, and identifies the particular playback apparatus that has transmitted this apparatus information.

The seed information transmitting unit 2210 transmits the seed information to the playback apparatus identified by the apparatus information receiving unit 2209.

This way, the key management apparatus in this embodiment transmits the seed information according to the request for seed information made by the playback apparatus. The playback apparatus realizes that the master key needs to be updated due to the trigger information included in the EMM, and transmits a request for seed information to the key management apparatus.

Accordingly, the playback apparatus and the key management apparatus each obtain the same seed information, and each of them will generate a new master key from the seed information with use of the same algorithm.

In this embodiment, the playback apparatus needs to communicate with the key management apparatus when updating the master key; therefore, the key management apparatus is able to identify a playback apparatus from which an unauthorized playback apparatus has derived.

For example, if it has been arranged so that playback apparatuses need to transmit their own IDs as a requesting signal and there is an unauthorized playback apparatus, then the same ID will be transmitted to the key management apparatus more than once. This way, the key management apparatus is able to judge that the playback apparatus having this particular ID is the one from which the unauthorized playback apparatus has derived.

It should be noted that the apparatus information and the seed information are transmitted via a telephone line in this embodiment; however, the transmission is not limited to this and they could be transmitted off line. The seed information may be also transmitted with use of EMM.

Third Embodiment

General Structure of the Conditional Access System

Figure 23:
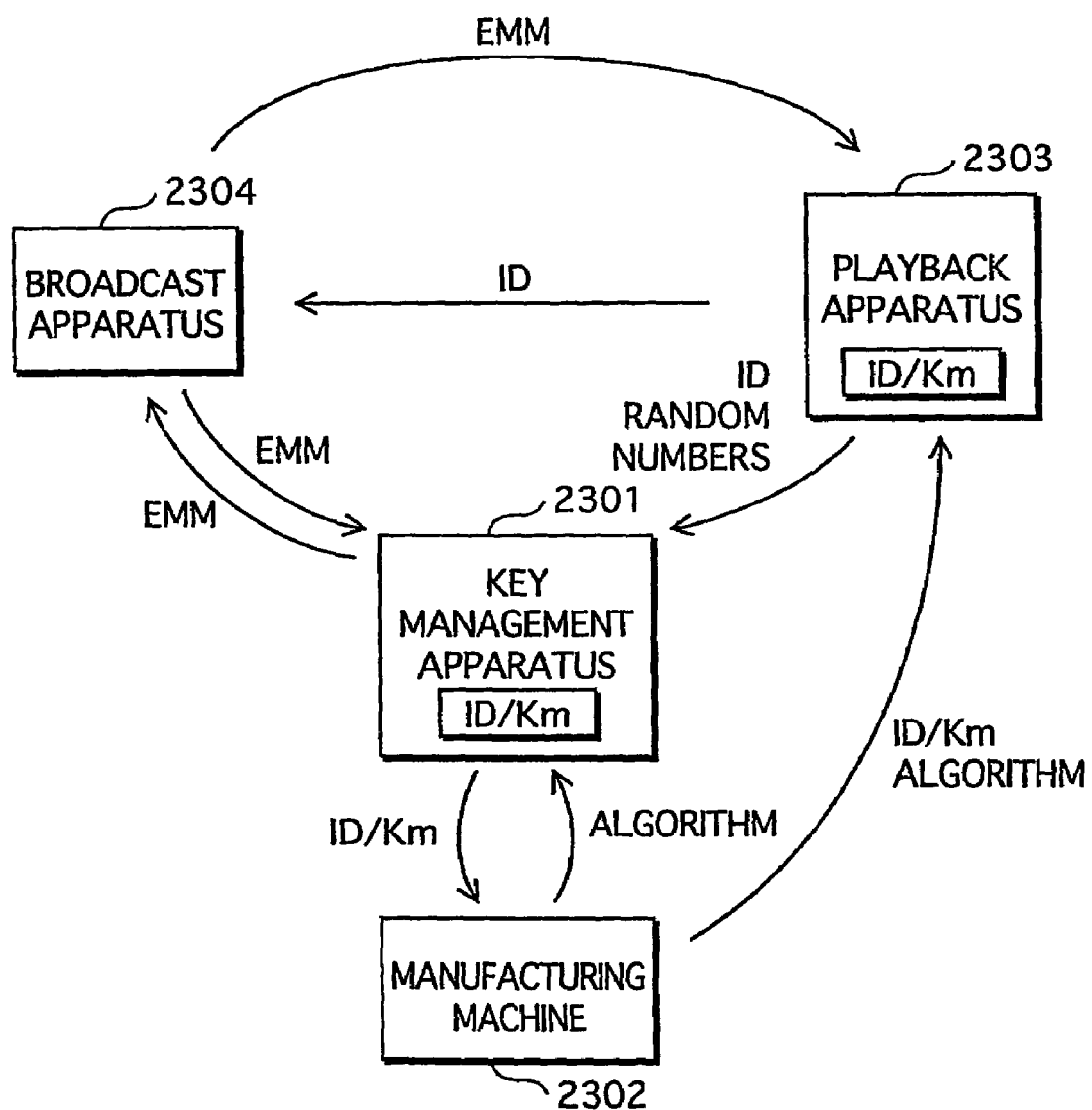
FIG. 23 shows the general structure of the conditional access system of the third embodiment.

FIG. 23 shows the general structure of the conditional access system of the third embodiment.

The conditional access system of the third embodiment comprises, a key management apparatus 2301, a manufacturing machine 2302, a playback apparatus 2303, and a broadcast apparatus 2304.

The procedure in which both the key management apparatus 2301 and the playback apparatus 2303 each own the same ID and the same master key Km, and the procedure in which the playback apparatus 2303 obtains a work key Kw are the same as in the first embodiment.

The third embodiment differs from the first embodiment in the method for updating the master key Km.

In the third embodiment, the master key Km is updated in the following manner:

The broadcast apparatus 2304 stores in EMM (i) an ID of the playback apparatus 2303 that needs an update of the master key and (ii) seed information from which a new master key Km' is to be generated, and broadcasts the EMM.

The playback apparatus 2303 realizes that the master key needs to be updated due to the seed information, generates event information, and generates a new master key Km' from both the seed information and the event information. Here, the event information denotes information that has a different value for each update. In this embodiment, random numbers are used as event information.

The playback apparatus 2303 then transmits apparatus information which includes the ID of the playback apparatus 2303 itself and random numbers to the key management apparatus 2301. The key management apparatus 2301 updates the master key using both the seed information and the random numbers.

Here, since only the key management apparatus and the playback apparatus of an authorized user store the same algorithms used to generate new master keys Km's from the seed information and the random numbers, only the key management apparatus and the playback apparatus of the authorized user are able to have the same new master keys Km's.

Accordingly, the conditional access system of the present embodiment is able to eliminate unauthorized viewing of contents by unauthorized users after the master keys are updated.

The following explains in detail the playback apparatus which is used to actualize such a conditional access system.

Structure of Playback Apparatus

The playback apparatus of the third embodiment is different from the playback apparatus of the first embodiment in only the Km updating unit. Thus, only the Km updating unit will be explained, and explanation on other parts of the structure will be omitted.

Figure 24:
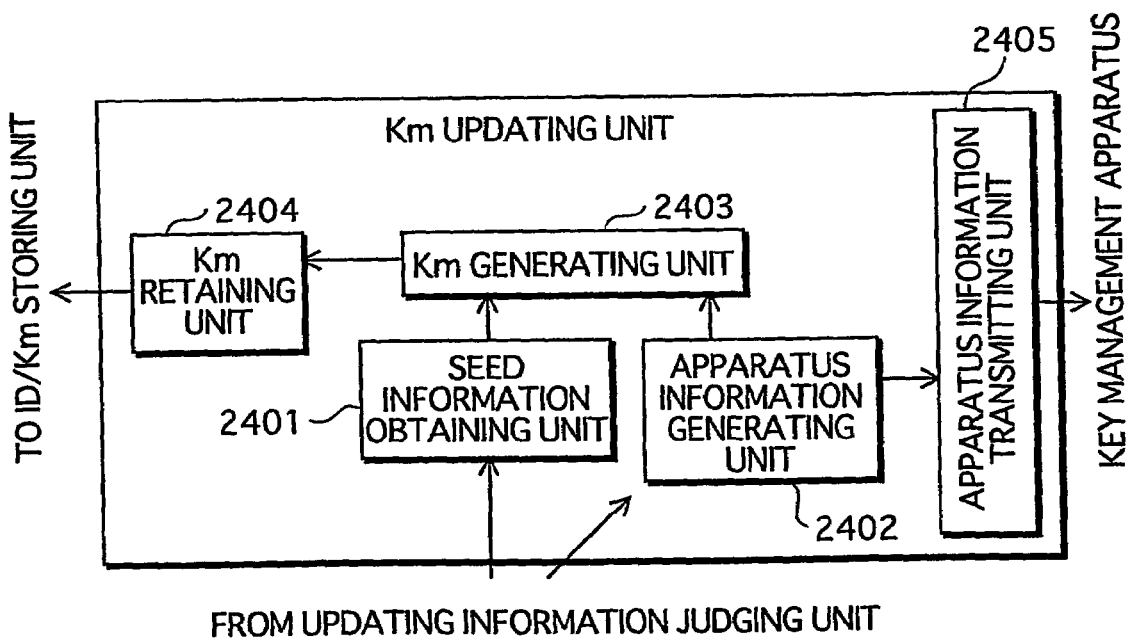
FIG. 24 shows the detailed structure of the Km updating unit in the third embodiment.

FIG. 24 shows the detailed structure of the Km updating unit in the third embodiment.

The Km updating unit comprises a seed information obtaining unit 2401, an apparatus information generating unit 2402, a Km generating unit 2403, a Km retaining unit 2404, and an apparatus information transmitting unit 2405.

The seed information obtaining unit 2401 obtains seed information from the updating information judging unit and inputs the seed information to the Km generating unit 2403 as an argument in the algorithm used for generating a master key.

The apparatus information generating unit 2402 generates random numbers in response to the notification from the updating information judging unit, combines the random numbers with an ID having already been stored in the apparatus information generating unit 2402 itself, and generates apparatus information unique to the playback apparatus. The apparatus information gets inputted to both the Km generating unit 2403 and the apparatus information transmitting unit 2405.

The Km generating unit 2403 generates a new master key Km' using an algorithm having been assembled into the Km generating unit 2403 itself. The algorithm is unique to each playback apparatus, each production lot, each model, or each manufacturer. The same algorithm is also stored in the key management apparatus.

The Km retaining unit 2404 retains the master key Km.

The apparatus information transmitting unit 2405 transmits the apparatus information generated by the apparatus information generating unit 2402 to the key management apparatus. Here, the apparatus information is transmitted via a telephone line.

In this embodiment again, there are two possibilities as will be mentioned below depending on at which point of time a new master key is generated, and it could be either way.

The first possibility is that a new master key is generated as soon as the seed information is obtained.

The second possibility is that the seed information is obtained and stored till it is necessary to generate a new master key. In this case, a new master key may be generated, for example, after EMM are inputted to the EMM decrypting unit, and then a signal transmitted from the EMM decrypting unit is received.

Structure of Key Management Apparatus

Figure 25:
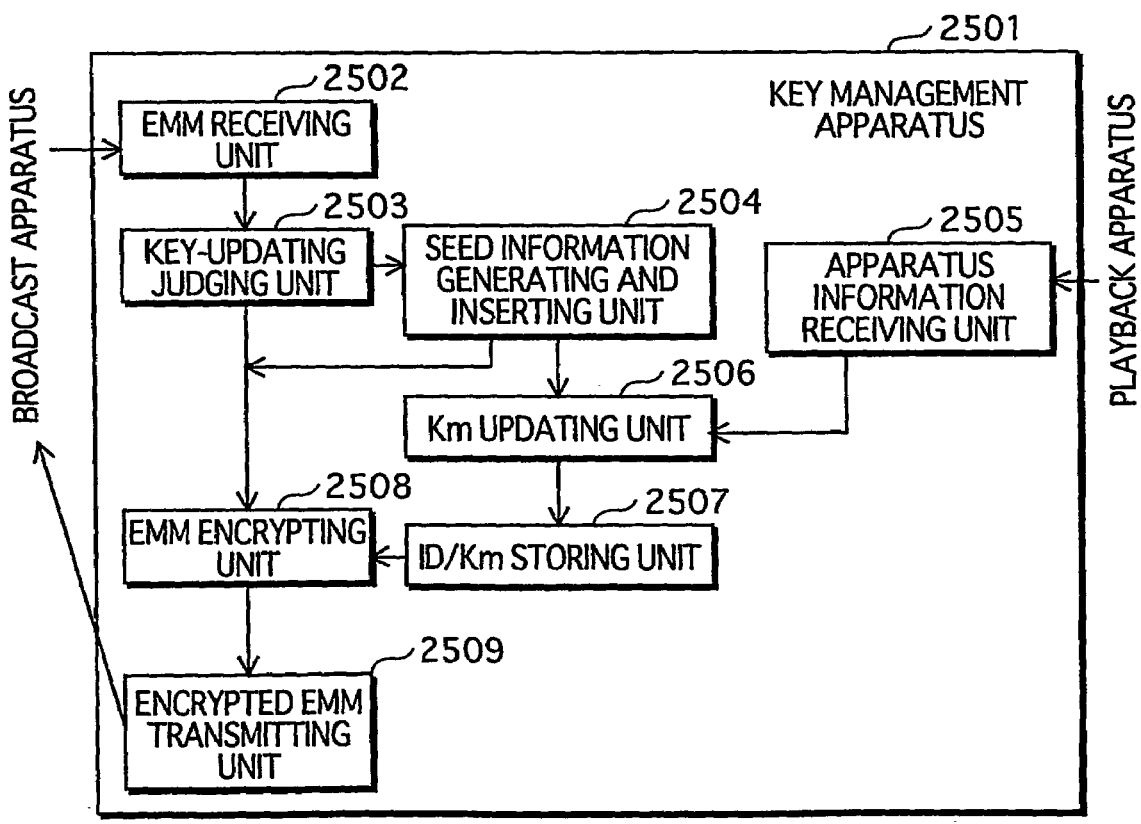
FIG. 25 shows the structure of the key management apparatus in the conditional access system.

FIG. 25 shows the structure of the key management apparatus in the conditional access system.

The key management apparatus in the third embodiment is different from the one in the first embodiment in the apparatus information receiving unit 2505 and the Km updating unit 2506. Accordingly, only the apparatus information receiving unit will be explained, and explanation on other parts of the structure will be omitted.

The apparatus information receiving unit 2505 receives apparatus information from the playback apparatus. The apparatus information is made up of an ID of the playback apparatus and random numbers generated in the playback apparatus. The apparatus information receiving unit 2505 identifies the particular playback apparatus that has transmitted this apparatus information, using the ID included therein.

The Km updating unit 2506 updates the master key using both seed information generated by the seed information generating and inserting unit 2504 and random numbers received by the apparatus information receiving unit 2505.

The new master key is generated with use of the same algorithm as the one stored in the playback apparatus.

This way, the key management apparatus in the third embodiment stores seed information in EMM and transmits the EMM to the playback apparatus, and receives random numbers from the playback apparatus. The playback apparatus realizes that the master key needs to be updated due to the seed information, and transmits the random numbers that are generated to the key management apparatus.

Accordingly, the playback apparatus and the key management apparatus each obtain the same seed information and the same random numbers, and each get to generate a new master key from the seed information and the random numbers with use of the same algorithms.

In this embodiment, the playback apparatus needs to communicate with the key management apparatus when updating the master key; therefore, the key management apparatus is able to identify a playback apparatus from which an unauthorized playback apparatus has derived.

For example, if it has been arranged so that playback apparatuses need to transmit their own IDs as a requesting signal and there is an unauthorized playback apparatus, then the same ID will be transmitted to the key management apparatus more than once. This way, the key management apparatus is able to judge that the playback apparatus having this particular ID is the one from which the unauthorized playback apparatus has derived.

It should be noted that the apparatus information is transmitted via a telephone line in this embodiment; however, the transmission is not limited to this and they could be transmitted off line.

In all the embodiments so far, the playback apparatus and the key management apparatus update only the master keys; however it is also acceptable that the IDs are updated as well as the master keys. The master keys and the IDs may be updated by being overwritten, or it may be arranged so that some of the IDs are stored and these stored IDs are valid, or all of the IDs are stored and all these IDs are valid.

In all the embodiments so far, the algorithm used to generate a new master key is managed by the key management apparatus; however, the invention is not limited to this as long as a secure state is provided. For instance, when there are more than one manufacturer and each manufacturer manages algorithms for the playback apparatuses of its own, there is a favorable effect of being able to disperse the risk because the plurality of algorithms are managed separately.

In the first embodiment, the method for updating the master keys is applied only to the playback apparatus in a conditional access system; however, it is also possible to apply the method for updating the master keys to other apparatuses that have keys corresponding to IDs in order to protect various kinds of information, e.g. SD cards and DVD playback apparatuses. The following explains an example in which the updating method is applied to a DVD playback apparatus.

Figure 26:
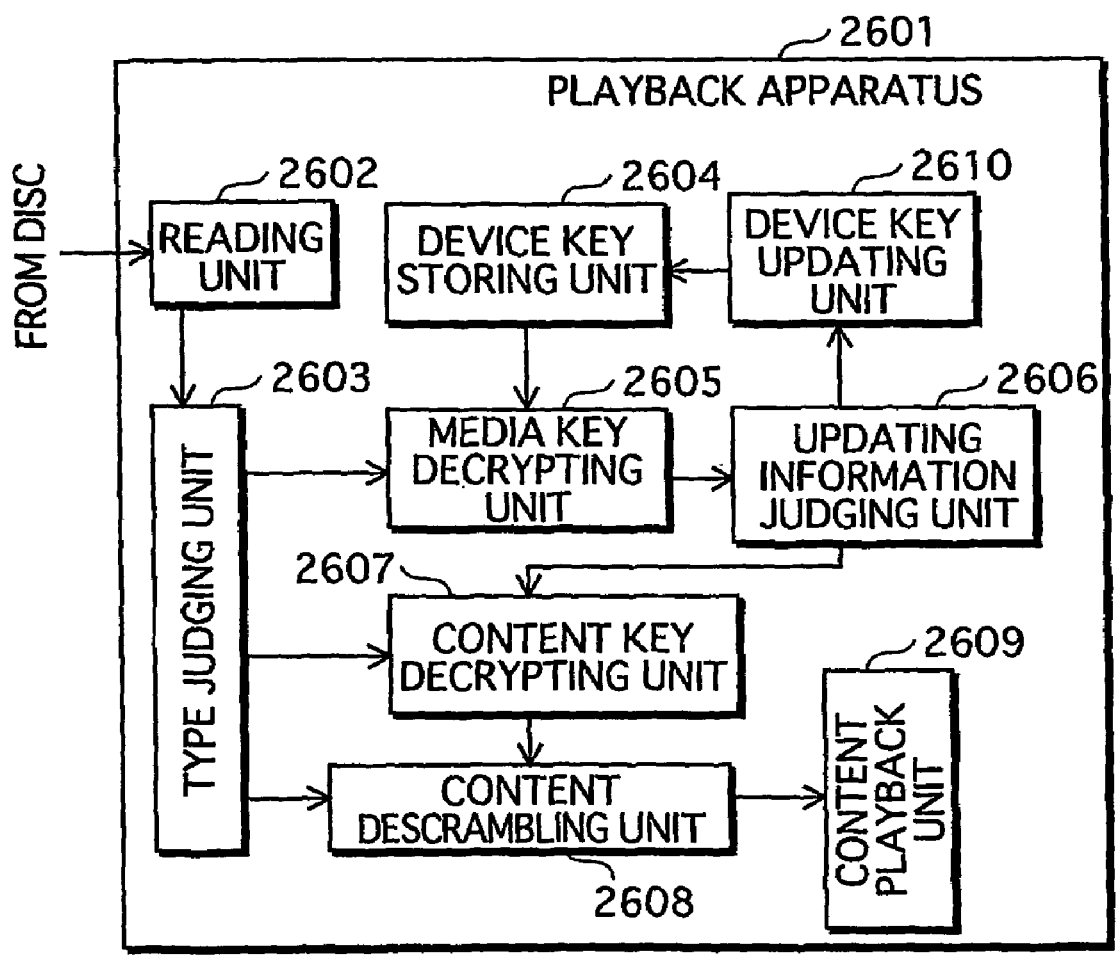
FIG. 26 shows the structure of a DVD playback apparatus.

FIG. 26 shows the structure of a DVD apparatus.

The playback apparatus 2601 comprises a reading unit 2602, a type judging unit 2603, a device key storing unit 2604, a media key decrypting unit 2605, an updating information judging unit 2606, a content key decrypting unit 2607, a content descrambling unit 2608, and a content playback unit 2609. The reading unit 2602 reads various kinds of information from a DVD, and the type judging unit 2603 transfers information to different destinations depending on what type of information it is.

The media key decrypting unit 2605 decrypts the data using a device key stored in the device key storing unit 2604 and inputs it to the updating information judging unit 2606.

The updating information judging unit 2606 inputs the data to the device key updating unit 2610, if the data includes updating information, and inputs the data to the content key decrypting unit 2607, if the data does not include updating information.

The device key updating unit 2610 generates a new device key using the updating information and updates the device key stored in the device key storing unit 2604.

This way, the playback apparatus 2601 is able to update the device key with use of the updating information judging unit 2606 and the device key updating unit 2610.

INDUSTRIAL APPLICABILITY

The present invention is applicable to a digital tuner used in a conditional access system. With the present invention, master keys are properly updated only in authorized digital tuners, and not in unauthorized digital tuners. Consequently, it is possible to eliminate content viewing by unauthorized digital tuners. In addition, it is easy and inexpensive to update the master keys since the master keys are updated with use of broadcast.

The invention claimed is:
1. A content playback apparatus comprising:
a storing unit that has a secret key stored therein;
a key information decrypting unit configured to (i) obtain encrypted key information that has been encrypted by a first secret-key encrypting method, and (ii) decrypt the encrypted key information into key information using the stored secret key, the key information being either a decryption key used for decrypting a content key or key-updating information used for updating the secret key;
a content playback unit configured to, when the decrypted key information is the decryption key, (i) decrypt an encrypted content key that has been encrypted by a second secret-key encrypting method, using the decryption key, (ii) descramble a scrambled content that has been scrambled by a scramble encrypting method, using the decrypted content key, and (iii) play back the descrambled content; and
an updating unit configured to, when the decrypted key information is the key-updating information, update the secret key according to the key-updating information.

2. The content playback apparatus of claim 1, wherein
the key information has an identifier attached thereto for identifying the key information as either the decryption key or the key-updating information, and
the content playback apparatus further comprises a judging unit configured to judge, according to the identifier, whether the key information is the decryption key or the key-updating information.

3. The content playback apparatus of claim 2, wherein
the key information is included in EMM, EMM denoting Entitlement Management Messages, and
the content playback apparatus further comprises
a broadcast receiving unit configured to receive broadcast data which includes encrypted EMM that have been encrypted with use of the secret key and thereby obtain the encrypted key information, and
the key information decrypting unit, obtains the encrypted key information received by the broadcast receiving unit.

4. The content playback apparatus of claim 1, wherein
the updating unit updates the secret key by generating a new secret key according to a conversion unique to each content playback apparatus, each production lot of content playback apparatuses, each model of content playback apparatuses, or each manufacturer of content playback apparatuses.

5. The content playback apparatus of claim 1, wherein
the key-updating information includes seed information from which a new secret key is to be generated, and
the updating unit updates the secret key by converting the seed information into the new secret key.

6. The content playback apparatus of claim 1, wherein
the key-updating information is trigger information which instructs that the secret key should be updated, and
the updating unit further includes:
a transmitting subunit configured to transmit, in response to the trigger information, a request signal requesting seed information from which a new secret key is to be generated, to a key management apparatus that manages one or more secret keys; and
a seed information receiving subunit configured to receive the seed information transmitted by the key management apparatus in response to the request signal, and
the updating unit updates the secret key by converting the received seed information into the new secret key.

7. The content playback apparatus of claim 1, wherein
the key-updating information includes seed information from which a new secret key is to be generated, and
the updating unit further includes
an outputting subunit configured to output event information that is different every time of output or once in every certain number of times of output,
the updating unit updates the secret key by converting the seed information and the event information into the new secret key, and
the content playback apparatus further comprises a transmitting unit operable to transmit the event information outputted by the outputting subunit to a key management apparatus that manages one or more secret keys.

8. The content playback apparatus of claim 1, wherein
the secret key stored in the storing unit is unique to each content playback apparatus, each production lot of content playback apparatuses, each model of content playback apparatuses, or each manufacturer of content playback apparatuses.

9. The content playback apparatus of claim 1, further having an ID) that is unique to each content playback apparatus, each production lot of content playback apparatuses, each model of content playback apparatuses, or each manufacturer of content playback apparatuses, wherein
the updating unit updates the secret key by converting the ID and seed information into a new secret key, the seed information being information from which the new secret key is to be generated.

10. The content playback apparatus of claim 2 wherein the content playback apparatus is one of a plurality of content playback apparatus from a single manufacturing source, and the updating unit includes a master key generating unit with a pre-stored algorithm that is executed with the key-updating information to generate a new master key, the pre-stored algorithm is one of a plurality of different algorithms assigned to the plurality of content playback apparatus, the updating unit is enabled when the judging unit judges that key-updating information is decrypted.

11. A content playback method to be used in a content playback apparatus which includes a storing unit that has a secret key stored therein, the content playback method comprising:

a key information decrypting step of (i) obtaining encrypted key information that has been encrypted by a first secret-key encrypting method, and (ii) decrypting the encrypted key information into key information using the stored secret key, the key information being either a decryption key used for decrypting a content key or key-updating information used for updating the secret key;

a content playback step of, when the decrypted key information is the decryption key, (i) decrypting an encrypted content key that has been encrypted by a second secret-key encrypting method, using the decryption key, (ii) descrambling a scrambled content that has been scrambled by a scramble encrypting method, using the decrypted content key, and (iii) playing back the descrambled content; and an updating step of, when the decrypted key information is the key-updating information, updating the secret key according to the key-updating information.

12. A key management apparatus that manages a secret key used in a secret-key encrypting method, comprising:

a key-updating information generating unit configured to generate key-updating information used for updating the secret key;

a transmitting unit configured to encrypt key information using the secret key and transmit the encrypted key information to a playback apparatus, the key information being either a decryption key for playing bark contents or the key-updating information; and a secret key updating unit configured to update the secret key according to the key-updating information.

13. The key management apparatus of claim 12, wherein the transmitting unit attaches, to the key information, an identifier for identifying the key information as either the decryption key or the key-updating information, before transmitting the key information.

14. The key management apparatus of claim 13, wherein the key information is included in EMM, EMM denoting Entitlement Management Messages, and the transmitting unit transmits the key information to the playback apparatus by broadcast.

15. The key management apparatus of claim 12, wherein the key-updating information includes seed information from which a new secret key is to be generated, and the secret key updating unit updates the secret key by converting the seed information into the new secret key.

16. The key management apparatus of claim 12, wherein the key-updating information is trigger information which instructs that the secret key should be updated, and the secret key updating unit further includes:

a seed information generating subunit configured to generate seed information from which a new secret key is to be generated; and a transferring subunit configured to receive a request signal transmitted by the playback apparatus that has obtained the trigger information, and transfer the generated seed information to the playback apparatus in response to the request signal, and the secret key updating unit updates the secret key by converting the seed information into the new secret key.

17. The key management apparatus of claim 12, wherein the key-updating information includes seed information from which a new secret key is to be generated, and the secret key updating unit further includes a receiving subunit configured to receive event information transmitted by the playback apparatus that has obtained the seed information, the event information being different every time of transmission or once in every certain number of times of transmission, and the secret key updating unit updates the secret key by converting the seed information and the event information into the new secret key.

18. A key management system made up of (i) a content playback apparatus and (ii) a key management apparatus that manages one or more secret keys used in a secret-key encrypting method for the content playback apparatus, the key management system comprising:

a key-updating information generating unit that is included in the key management apparatus and is configured to generate key-updating information used for updating each secret key;

a transmitting unit configured to encrypt key information using a first secret key, and transmit the encrypted key information to the content playback apparatus, the key information being either a decryption key for playing back contents or the key-updating information;

a key information decrypting unit that is included in the content playback apparatus and is configured to obtain the encrypted key information transmitted by the transmitting unit and decrypt the encrypted key information into key information using a second secret key, the second secret key being stored in the content playback apparatus;

a first updating unit that is included in the key management apparatus and is configured to update the first secret key according to the key-updating information; and a second updating unit that is included in the content playback apparatus and is configured to, when the decrypted key information is key-updating information used for updating the second secret key, update the second secret key according to the key-updating information.

* * * * *

UNITED STATES PATENT AND TRADEMARK OFFICE
CERTIFICATE OF CORRECTION

PATENT NO. : 7,401,232 B2 Page 1 of 1
APPLICATION NO. : 10/482846
DATED : July 15, 2008
INVENTOR(S) : Ono et al.

It is certified that error appears in the above-identified patent and that said Letters Patent is hereby corrected as shown below:

In the Claims:
In Claim 3, Column 26, line 3, "unit, obtains'" should be --unit obtains--
In Claim 9, Column 26, line 54, "ID) that" should be --ID that--
In Claim 16, Column 28, line 6, "anew secret" should be --a new secret--

Signed and Sealed this

Seventh Day of October, 2008

JON W. DUDAS
*Director of the United States Patent and Trademark Office*